(12) United States Patent
Fahy

(10) Patent No.: US 11,594,255 B2
(45) Date of Patent: Feb. 28, 2023

(54) SYSTEMS AND METHODS FOR AUTOMATED GENERATION OF VIDEO

(71) Applicant: Kristin Fahy, Sauquoit, NY (US)

(72) Inventor: Kristin Fahy, Sauquoit, NY (US)

(*) Notice: Subject to any disclaimer, the term of this patent is extended or adjusted under 35 U.S.C. 154(b) by 0 days.

(21) Appl. No.: 16/851,992

(22) Filed: Apr. 17, 2020

(65) Prior Publication Data
US 2020/0335132 A1  Oct. 22, 2020

Related U.S. Application Data

(60) Provisional application No. 62/835,892, filed on Apr. 18, 2019.

(51) Int. Cl.
*G11B 27/031* (2006.01)

(52) U.S. Cl.
CPC ................. *G11B 27/031* (2013.01)

(58) Field of Classification Search
CPC .................................................. G11B 27/031
USPC .......................................................... 386/290
See application file for complete search history.

(56) References Cited

U.S. PATENT DOCUMENTS

| | | | |
|---|---|---|---|
| 7,352,952 B2 | 4/2008 | Herberger et al. | |
| 8,270,487 B1 | 9/2012 | Kizhepat et al. | |
| 9,344,606 B2 | 5/2016 | Hartley et al. | |
| 10,074,013 B2 | 9/2018 | Newman et al. | |
| 10,108,862 B2 | 10/2018 | Laska et al. | |
| 10,192,583 B2 | 1/2019 | Chee et al. | |
| 2003/0018974 A1* | 1/2003 | Suga | H04N 21/4782 725/86 |
| 2009/0282338 A1 | 11/2009 | Bohms | |
| 2011/0030031 A1 | 2/2011 | Lussier et al. | |
| 2011/0066945 A1 | 3/2011 | Lee et al. | |
| 2014/0372910 A1 | 12/2014 | Alford Mandzic et al. | |
| 2015/0318020 A1 | 11/2015 | Pribula | |
| 2017/0185254 A1 | 6/2017 | Zeng et al. | |
| 2017/0199872 A1 | 7/2017 | Krasadakis | |
| 2017/0289617 A1 | 10/2017 | Song et al. | |
| 2018/0357316 A1 | 12/2018 | Neuvonen et al. | |

OTHER PUBLICATIONS rawshorts.com, Rawshorts—Explainer Video Software.pdf.

* cited by examiner

*Primary Examiner* — Daniel T Tekle

(57) ABSTRACT

Methods, systems, and computer readable medium with instructions for generating a master video, including receiving input from a video creator that initiates a video project, soliciting video file responses from respondents, and receiving video files from respondents, combining the video files into a master video file which corresponds to a master video. The video files correspond with master video segments of the master video. A relative position of each of the master video segments in the master video is based on a formulated sequence. The system may include one or more processors; one or more data storage devices; one or more input devices; one or more output devices; a network interface; and at least one communications bus operably interconnecting the other elements. The one or more data storage devices includes the instructions which are executed by the one or more of the processors.

31 Claims, 14 Drawing Sheets

| Video Title: We Love You Tom Picture file | Question 1: What's one word to describe Tom? | Responde nt 1, Question 1 video response | Respondent 2, Question 1 video response | Question 2: What's a favorite memory with Tom? | Respondent 1, Question 2 video response | Respondent 2, Question 2 video response | Video Close: Get Well Soon, Tom! Picture file |
|---|---|---|---|---|---|---|---|

300

302 — Questions

Question 1

What's your favorite use for the product?

Question 2 (optional)

Lorem ipsum dolor sit amet?

304 — Response Deadline

◉ On this date     ○ After a number of responses

05 / 04 / 2019     20

306 — Email Invitation Message                                                  Preview From Email Address info@email.com Roboto  ▾  11  ▾  B  I  U  A ▾  ≡ ≡ ≡ ≡

Hello,

We're doing a super quick video survey that asks __ (autofill based on # of questions) questions and helps you record video responses.

These videos will help us _____ (user enters, we could provide examples) We will review all videos internally, and some may be shared _____ (user enters, we could provide examples).

Click on this link and you'll be guided through everything then within a few minutes, you'll be done!

Please do this at a time when you feel "camera ready", but by no later than ____ **(autofill based on end date set\*)**.

Thank you in advance for your time and consideration!
UserName (autofill but can be edited)

Click Here to Get Started

308

Cancel

FIG. 3

| Video Title: We Love You Tom Picture file | Question 1: What's one word to describe Tom? | Respondent 1, Question 1 video response | Respondent 2, Question 1 video response | Question 2: What's a favorite memory with Tom? | Respondent 1, Question 2 video response | Respondent 2, Question 2 video response | Video Close: Get Well Soon, Tom! Picture file |
|---|---|---|---|---|---|---|---|
| | | | | | | | |

SYSTEMS AND METHODS FOR AUTOMATED GENERATION OF VIDEO

CROSS REFERENCE TO RELATED APPLICATIONS

The present application claims priority to provisional application No. 62/835,892 filed on Apr. 18, 2019 and the subject matter of provisional application No. 62/835,892 is incorporated by reference herein in its entirety.

FIELD OF THE INVENTION

The present invention relates to systems and methods for automatically generating video quickly, accurately, and without the need for having video editing skills.

BACKGROUND OF THE INVENTION

Existing technologies for recording, producing, and/or finalizing a video often requires many steps of manual labor as well as a certain amount of skill. A person/video creator may generate videos or obtain videos from others (video segments) and then use a video editing tool to arrange the video segments in a particular order, and then manually edit the video to finalize the video. For example, to create a video including a series of prompts (questions) and answers from one or more video respondents (video subjects or respondents) requires a lot of manual labor and knowledge of video editing. Using existing techniques, a video creator could solicit video responses recorded on, for example, a respondent's phone, video camera, and the like. When the creator receives the content (multiple video files), the creator can use a video editing tool to laboriously organize all of the content into one video file (as stated above). It may take a long time to request content, gather content, organize it, manually load it into a video editing tool, create intro, closing, or transition clips, arrange all the video clips in a desired sequence, and make edits to the video. This may result in video clips being lost, not loaded to the master video file, loaded in the wrong location, or not cut or edited properly. Traditional video editing tools are also complicated and may require a steep learning curve. Existing approaches to recording, producing, organizing and/or finalizing videos are thus time consuming, labor intensive, prone to errors, require having or learning video editing skills, and otherwise cumbersome. There is a need to provide a way for people to be able to easily and automatically be able to prepare a video without having to spend a lot of time or having editing skills. Even if such a tool were to cost money, it would conserve resources to generate a video automatically and with little effort and may even reduce total production costs. The present invention addresses this need by providing a software tool to automatically generate a master video file from video segments and other content.

SUMMARY

Embodiments of the invention may be directed to a method for generating a master video which may include receiving one or more video files from one or more respondents as well as combining the one or more video files into a master video file in which the master video file corresponds to the master video and where the one or more video files correspond to one or more master video segments in the master video, and where a relative position of each of the master video segments in the master video is based on a formulated sequence. Such formulated sequence may be based on at least one selected from the group consisting of: the respondents who respond, prompts which are responded to by the respondents, a number of respondents, a number of prompts, the prompts which are assigned to each respondent, a total number of responses to be collected, and a response time limit for providing the one or more video files.

The method may include sending to each of the one or more video respondents one or more prompts to provide the one or more video files and the formulated sequence may be based on a master logic algorithm. The relative position of each of the master video segments in the master video may be based, at least in part, on the one or more prompts which are provided to the one or more respondents and/or responses to such one or more prompts by the one or more respondents.

The method also includes beginning a video content project by providing at least one input selected from the group consisting of: a project title, an opening message, a topic, a name, one or more prompts, a closing message, a video thumbnail, a deadline for submission of video files, digital image files (for example pictures of subjects and/or logo images in all formats of digital image files such as JPEG, TIFF, GIF, PNG, and raw image files), a maximum number of video files, and a list of contact information for the respondents, wherein the opening message and/or the closing message and/or the prompts comprise text and/or video and/or audio. The method may include creating a project database with fields correlated to input provided by the video creator and/or based on the standard logic algorithm. Each item of input provided by a video creator and/or each of the one or more video files provided by the one or more respondents may be sent to be stored in data storage to be stored and given a unique identifier that reflects its storage location, and where at least one field of a project database is updated to record a storage location of each item of input provided by the video creator and/or each of the one or more video files provided by the one or more respondents.

The method may also include receiving at least one creator input and creating an initial master video file based on such input, where the initial master video file is configured to generate an initial master video. A master video file can be based on video creator input and on the one or more video files from respondents. An intermediary version of this master video file may be generated upon the receipt of each video file from respondents. The intermediary version of this master video file may be configured to generate an intermediary version of the master video. The method can also include requesting a modification of one intermediary version of the master video, resulting in the generation of a further version of the master video file which is configured to generate a further version of the master video.

When the video files are combined into the master video file, this may include incorporating in the master video file data corresponding to at least one input selected from the group consisting of: the project title, the opening message, the topic, the name, the one or more prompts, the closing message, the video thumbnail, master video edits, and/or the digital image files.

A version of the master video file may be automatically created upon receipt of at least one of the video files. Also, combining the video files into the master video file may occur as each of the video files is received, resulting in a different version of the master video file being created as each additional of the video files is received and added to the master video file.

The master video file may be modified by adding data corresponding to one or more video files to the master video file and/or editing the master video resulting in a modified master video file, storing the master video file in a data storage location, storing the modified master video file in another data storage location, and creating master video identification data to keep track of the master video file and the modified master video file.

The present invention may include storing the master video file in a data storage location and creating master video identification data to identify the location of the master video file. Then, additional video files may be received and new versions of the master video file may be generated by incorporating data corresponding to the additional video files and/or data corresponding to edits made to the master video. The new versions of the master video file may be stored in the data storage location thereby rewriting previous versions of the master video file or storing the new versions of the master video file in different data storage locations. If different data storage locations are used, the new versions of the master video file in different data storage locations includes creating master video identification data to identify the locations of the new versions of the master video file. In either case a project database will be updated with the master video identification data to keep track of the location of the new versions of the master video file.

One or more prompts provided to respondents include at least one selected from the group consisting of: questions and topics. Such prompts may be generated by a video creator and/or may be chosen from a list of standard prompts. The one or more prompts sent to a respondent may associated with a tag, metadata, an/or other identifier specific for such respondent and/or wherein each video file is associated with a tag, metadata, and/or other identifier designating which respondent submitted such video file, which prompt it is in response to, and/or designating a location in the master video where a corresponding master video segment is determined to be positioned.

A version of the master video file may be created and be based on a database which includes placeholders correlated with at least one input selected from the group consisting of: one or more prompts, video segments, titles, transitions, animations, introductions, ending portions, and credits, wherein such placeholders are correlated with a tag and/or metadata and/or other identifiers corresponding to such inputs, and wherein the placeholders are arranged pursuant to a master logic algorithm.

The method may include editing the master video file by requesting at least one change to the master video selected from the group consisting of: adding transitions, ensuring consistent video quality, providing consistent audio levels, smoothing transitions between at least two of the video segments in the master video, adjusting the length of any of the video segments, adjusting the location of the prompts in the master video, adjusting the location of the master video segments in the master video, removing master video segments if desired, adding filters, adding text, editing text, adjusting volume levels, adjusting brightness, and adjusting contrast.

The master video file may be shared. The sharing of the master video file may occur once all prompts used to create the master video file have been answered, a video creator has received all video files from the respondents, a predetermined time has elapsed, a designated number of the video files have been received, the video creator has initiated sharing, or another triggering event has occurred. The master video file may be generated in real time upon the receipt of each of the video files.

In the present invention, a different version of the master video file may be generated in real time upon the receipt of each of the video files.

The present invention is also directed to systems, and computer readable medium with instructions for generating a master video, including receiving input from a video creator that initiates a video project, soliciting video file responses from respondents, and receiving video files from respondents, combining the video files into a master video file which corresponds to a master video. The video files correspond master video segments of the master video. A relative position of each of the master video segments in the master video is based on a formulated sequence. The system may include one or more processors; one or more data storage devices; one or more input devices; one or more output devices; a network interface; and at least one communications bus operably interconnecting the other elements. The one or more data storage devices includes the instructions which are executed by the one or more of the processors.

BRIEF DESCRIPTION OF THE DRAWINGS

Features and advantages of the invention will be apparent from the following, more particular description of various embodiments, as illustrated in the accompanying drawings wherein like reference numbers generally indicate identical, functionally similar, and/or structurally similar elements.

FIG. 3 illustrates an interface for configuring a video production project according to various embodiments.

FIG. 12 illustrates how both creator and respondent provided content is combined into a master video file.

DETAILED DESCRIPTION OF THE INVENTION

Figure 1:
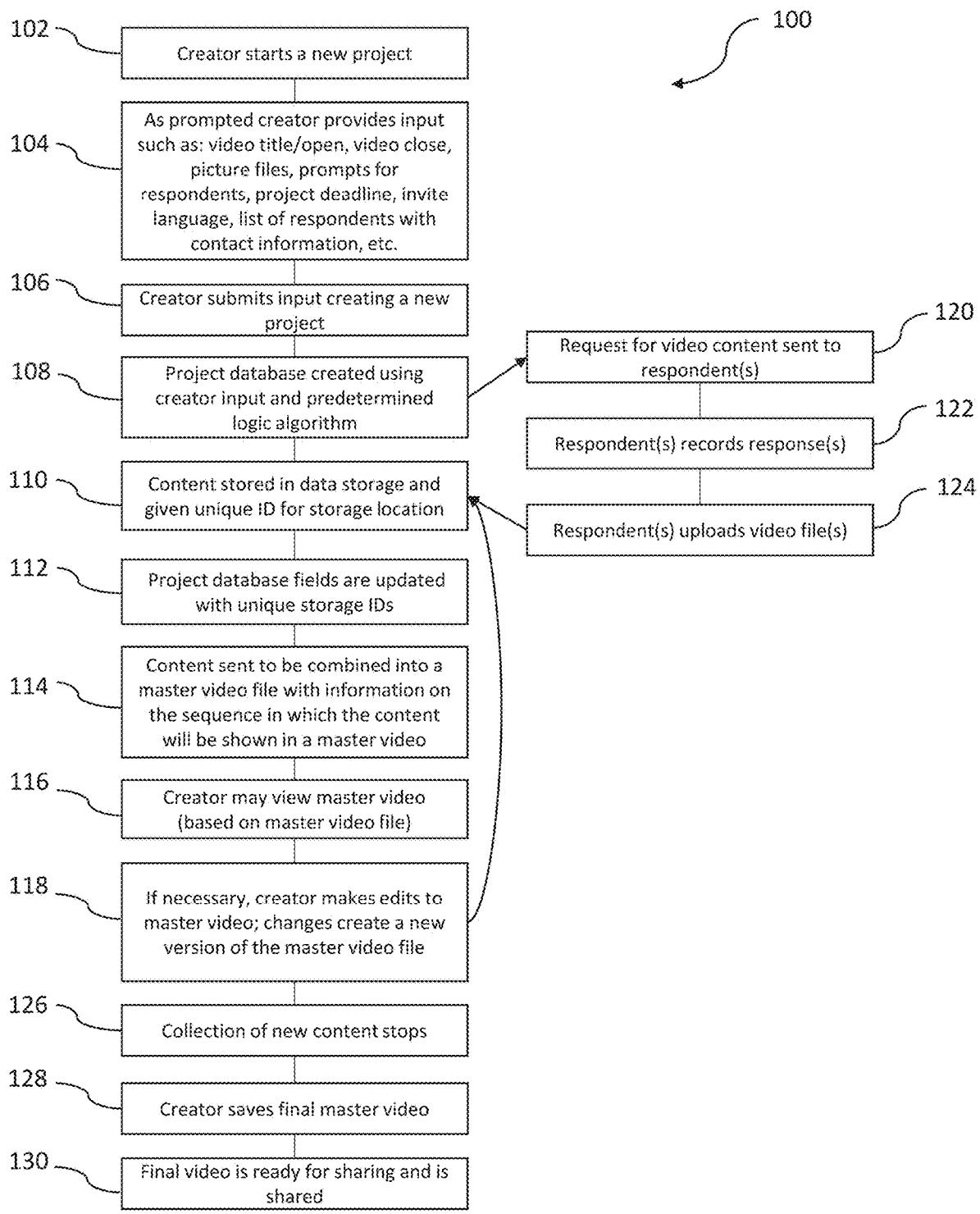
FIG. 1 illustrates a flow diagram overview of a method of generating and organizing video content according to various example embodiments.

The detailed description set forth below is intended as a description of some, but not all, of the configurations of the subject technology and is not intended to represent an exhaustive list. The detailed description includes specific details for the purpose of providing a thorough understanding of the present invention and subject technology. The subject invention and technology is not limited to the specific details set forth herein and may be practiced without these specific details. In other instances, well-known structures and techniques have not been shown in detail so as not to obscure the disclosure. Exemplary embodiments are discussed in detail below. While specific exemplary embodiments are discussed, it should be understood that this is done for illustration purposes only. In describing and illustrating the exemplary embodiments, specific terminology is employed for the sake of clarity. However, the embodiments are not intended to be limited to the specific terminology so selected. A person skilled in the relevant art will recognize that other components and configurations may be used without parting from the spirit and scope of the embodiments. It is to be understood that each specific element includes all technical equivalents that operate in a similar manner to accomplish a similar purpose. The examples and embodiments described herein are non-limiting examples.

All publications cited herein are hereby incorporated by reference in their entirety. As used herein, the term "a" refers to one or more. The terms "including," "for example," "such as," "may be" and the like, are meant to include, but not/e limited to, the listed examples.

Disclosed herein are techniques for automated generation, organization, editing, finalization, and/or distribution of video. An automated process of generating a master video file, collecting project content (project title, questions, closing message, digital image files etc.), procuring multiple video content segments (video responses from video subjects/respondents), inserting the project content and video content segments into the master video file so that when the master video file is played, such video content segments will appear in designated locations, editing the videos, and/or creating a final master video (the final master video as used in the present application means the final version of the master video) based on the populated master video file is disclosed. A master video file reflecting general video layout, placeholders for video segments, and/or other elements is generated based on a master logic algorithm. The master logic algorithm is based on a standard logic algorithm and/or input from a video creator. Preferably, the master logic algorithm is based on both the standard logic algorithm and input from a video creator. The term "input" (which can otherwise be referred to as "content") is intended to broadly cover any type of input, including text data, video data, photo data, audio data, or other data in any form. The term "input" can also be referred to as "input data". The term "content" can also be used to refer to "input". Moreover, the "input" can be provided directly by a video creator or it can be "selected" by the video creator based on options provided by the software. For example, if a question such as "how do you feel about the weather?" is presented as an option to the video creator, and the video creator selects this question, such question becomes "input" from the video creator even though it is not created from scratch by the video creator. Thus, the term to "enter" input includes input that is entered or submitted directly such as text or videos, etc., and input which is entered indirectly by making certain choices provided by the software.

The standard logic algorithm is a logic algorithm that determines the relative location of certain portions of the final video. For example, the standard logic algorithm may include positional information for the project title, opening and closing messages (text and digital image files), certain prompts, etc. as they would appear in the master video. For instance, opening and closing messages can be designated to go at the beginning and end of a master video, respectively, and the display of topics or questions can be arranged in a particular standard order. The input from a video creator can further be utilized to determine the relative location of certain portions of the master video (which may also be referred to herein as the "final video") such that both the standard logic algorithm and input from the creator can be utilized to create a master logic algorithm to determine the relative location of certain portions of the master video. Those certain portions of the master video that consist of/reflect creator input and/or respondent input can be referred to herein as "master video segments". Video segments are recorded by respondents and corresponding files are automatically placed into the master video file based on the master logic algorithm. The video segments may be recorded in response to prompts (questions, topics, etc.) provided to the video respondents. Video files corresponding to the video segments (video responses) are added into the master video file with no manual labor required from the video creator. Once all video files corresponding to video segments (video responses) are added into the master video file or the master video file is otherwise ready for finalization the video creator can make edits or adjustments to the content of the master video file to finalize it for distribution.

In the present description, when a master video file is described to "correspond" to a master video, this means is that the master video file can be, directly or indirectly, utilized to play the master video. For example, the master video file may be executed directly to play the master video, or the master video file can be accessed by software that plays videos in order to play the master video. In the present description, when a video file is described to "correspond" to a video segment, this means that at least some of the data in the video file will directly or indirectly be used to play the video segment, such as when data from the video file is combined into a master video file which is used to play the master video, including the video segments in the master video. In the present description, when files are "combined" into a master video file it means that at least some data from the files is included (whether in exact or modified form) in the master video file. Concatenation is one example of "combining" files. In the present description, when it is stated that a file is "placed" or "added" into the master video file, what this means is that such file is "combined" into the master video file. In the present description, when a file is "placed" or "added" or "combined" into a video, what this means is that such file is "placed" or "added" or "combined" into a video file corresponding to such video. In the present application, if a video is "placed" in the master video, this means that a file corresponding to the video is "placed" in the master video file corresponding to the master video. In the present description, when a master video is "edited", what this means is that the master video file corresponding to such master video is modified to effectuate the desired edits to the master video. For example, if a master video is "edited" by a video creator to remove a video segment, this can mean that the video creator put in a command to remove such video segment, and the software would go through various processes to modify the master video file such that the master video no longer includes such video segment. To the video creator, this may appear to happen instantaneously. In this description to "modify" a master video file means to generate a new and updated version of the master video file and this can be done by generating a new version of the master video file in a different location in storage, or this can be done by overwriting the master video file with the new version of the master video file with the new version of the master video file in the same storage location.

In various embodiments, a video content platform is used to perform the techniques disclosed herein. In one example platform, a video content project is initiated at a video editor application (automated video editor application) on a desktop, mobile device, and/or other computing device. The video editor application may be used to create the master video file, edit the master video file, and generate a final video file (which is the final version of the master video file). The video editor may generate a master video file, provide project title, opening and closing messages (text and digital image files), generate prompts (questions) for video responses, send the prompts to video respondents, receive video responses (video clips), automatically modifying the master video file such that the video responses are in a designated location in the video resulting from the master video file, generate the master video file, enable edits to the master video file, finalize the master video file, and/or distribute the master video file.

In some embodiments, the video content creation application may communicate with applications on computing devices (e.g., mobile devices, desktop computers, etc.) associated with one or more respondents. The respondents may include individuals that record video responses to prompts, questions, topics, and the like. Respondents may, for example, record video responses (video clips) to prompts on their mobile device (e.g., phone or tablet), photo camera, video camera, and/or other video recording device or device with video recording capabilities. The video responses (video clips) are provided to the video editor application. The video editor application automatically compiles the files corresponding to the video clips into a master video file, generates the master video file, enables and/or facilitates edits to the master video file, and generates a master video from the master video file.

The techniques disclosed herein improve on the manual process of requesting new video content, manually gathering and organizing the related video files, creating a master video file in an editing tool, loading all video files into the editing tool, selecting the specific location to place each video file within the master video (by modifying the master video file such that when it is executed or accessed to display a video, the content of the video is displayed in the correct order), editing the video content, and sharing the master video file. In an example implementation, the techniques disclosed herein significantly reduce the amount of time required to create a final video, reduce the risk of losing or misplacing content, reduce the risk of placing content in the wrong place within the video project, eliminate the need to have or learn video editing skills, simplify the editing process, and reduce video production costs (due to the significant reduction in time and editing skills needed) while producing quality video content.

In various embodiments, the techniques disclosed herein are used to automatically generate a master video file corresponding to a master video including multiple individual master video segments (clips). For example, the techniques disclosed herein can be used to aggregate online survey responses from multiple respondents into a master data file (e.g., a master video file). This improves on existing approaches where a survey organizer (video creator, video editing professional) downloads a unique data file for each respondent and then must manually aggregate the responses into one master data file. Improving on existing technologies, the techniques disclosed herein aggregate all unique video content into one, downloadable master video file rather than an organizer needing to download unique videos that then must be manually aggregated into one master video file or master video and arranged in the proper sequence including introduction, titles, closing, credits, etc.

In some embodiments, the techniques disclosed herein improve online survey technology by providing questions to respondents using a video response question type and then automatically inputting those video responses into a predetermined location in a master video (via a master video file) in an online video editor. The video editor may include automated editing features to generate a master video file. The techniques disclosed herein may be implemented as a platform for the creation of automated video content with minimal to no intervention from a creator.

In various embodiments, the techniques disclosed herein may be implemented as, but not limited to, any of the following. The techniques disclosed herein may be implemented as a marketing tool for testimonials, product reviews, frequently asked questions, how-to's, marketing contests and the like. The techniques disclosed herein may be implemented as a market research tool to collect video responses on their own or in combination with other types of qualitative and quantitative data. The techniques disclosed herein may also be implemented as a human resources tool for employee recognition by colleagues and superiors, for recruitment to provide various perspectives on an organization, for references during the hiring process, for reference checks, and/or other uses related to an organization. In certain cases, the techniques disclosed herein may be implemented as a patient support tool, for example, to compile a master video including clips from friends and family members for a patient with an illness. The techniques disclosed herein may be implemented to generate personal greetings, such as happy birthday greetings, holiday greetings, and the like, including a composite video with multiple video clips from friends, family members, and/or other acquaintances. The techniques disclosed herein may be used for memorializing or honoring a person, an organization, an event, an occasion, or anything of the like. The techniques disclosed herein may be implemented to create messages of support for loved ones separated for any reason (military service, refugee status, incarceration, etc.). The techniques disclosed herein may be implemented to generate references or reviews for professional or personal reasons. The techniques disclosed herein may be implemented to create messages to support fundraising initiatives. The techniques disclosed herein may be implemented to generate messages of gratitude for a person or organization. The techniques disclosed herein may be used to collaborate on creative works with contributions coming from artists collaborating around a specific theme.

FIG. 1 illustrates a flow diagram overview of a method of generating and organizing video content according to various example embodiments. A process (100) for automatically generating video is depicted. In various embodiments, the steps of video generation process (100) may be carried out at a video editor application, one or more mobile video response applications, and/or other elements. These applications may operate on desktop computers, mobile devices, servers, and/or other computing devices. A creator (for example, the person creating the video project and who is using the video editing platform) may initiate the video creation process. In the present application, reference numbers with parentheses around them are references to method steps. A video content project is initiated by a creator starting a new project (102). The creator is then prompted by the platform to provide input such as entering or typing in a response of free form text, providing files or videos or other content, and/or selecting from a provided list of options, including but not limited to: a project or video title, video open message, video close message, digital image files, one or more prompts (questions or topics) for respondents, project deadline, a video thumbnail, invite language, list of respondents with contact information, a topic, a name, a deadline for submission of video files, a maximum amount of video files, and/or other information (104). The number of respondents is preferably a plurality of respondents. In the present application, the term "plurality" means more than one. The creator may add a project and/or video title such as "Customer Perspectives on Product A", "We Love You Tom", "Deb's Resources", "What our customers say," and the like to identify the subject of the project, or identifying a target, such as a topic, a name, and/or other information for the project. A closing message may also be included such as "Check Out Product A", "Get Well Soon, Tom!", and the like.

Content such as digital image files may be uploaded for inclusion in the video. For example, a creator (otherwise referred to as "video creator") may be prompted to upload a digital image file to be used as a thumbnail for the video, displayed in the video intro and/or closing, used in the background, and/or otherwise associated with the video. Prompts such as questions or topics for video content can be selected since pre-written options may be included in the software or the creator can enter customized questions and topics. In one example, the creator may enter questions that will be prompted to video respondents (e.g., interviewees). The questions may be manually entered in a question input interface. In certain cases, the creator may select a template type or video type, and pre-designated questions associated with the event type or video type are loaded for consideration and/or selection. The prompts are used to generate a master video file, as discussed herein. Deadlines may be set for the respondents to respond to the prompts. Each respondent may be assigned the same deadline or individual respondents may be assigned different deadlines. In certain cases, a limit may be set on the length of time for each video response.

For example, each video response may be limited to one minute and/or any other duration. In certain cases, a limit may be set for the total number of responses to be collected. An editable invite for the questions is generated. The invite may include, for example, an email requesting that the respondent provide video responses to the questions (prompts) by the provided deadline. The invite may also provide general context regarding the video project to orient and prepare the respondent to provide meaningful video answers to the prompts. One or more respondents (e.g., video respondents or interviewees) are provided and/or selected by the creator. For example, a creator may input a list of names, email addresses, phone numbers, and/or other information for the respondents. In some embodiments, the creator may associate certain questions (prompts) with particular respondents. For example, a first respondent may be assigned a first set of questions. A second respondent may be assigned a second set of questions different from the first set of questions, though there of course may be overlap between the questions. A third respondent may be assigned the first set of questions, second set of the questions, and/or a third set of questions. In certain cases, each one or more respondents are assigned a bespoke set of questions.

At step (106) of FIG. 1, the creator submits the input (the input submitted by the creator may be referred to as "creator provided input") and a new project is created in the computer system. All creator provided input is uploaded to the computer system. A project database is created with the appropriate fields based on the master logic algorithm (which is based on the standard logic algorithm and creator provided input) (108). An example of sequencing determined by the master logic algorithm is to place the title and/or opening message with corresponding digital image files before a master video segment with the text for question one, followed by placeholders for video responses to question one, followed by a master video segment with text for question two, followed by placeholders for video responses to question two and so on as needed, followed by a master video segment that contains a closing message and associated digital image file. At this time (after step (108)), step (110) and/or step (120) may be carried out. If step (110) is carried out, the content from the creator may be stored in data storage and given a unique ID to identify its storage location. If step (120) is performed, a request for video content may be sent to respondent(s). After step (120), step (122) may be performed in which respondent(s) record responses, such as creating videos. Respondent(s) can then perform step (124) and upload the video file(s) associated with the created videos. Input provided by respondents may be otherwise referred to as respondent created input, and may include the created video files. Step (110) can be carried out again in which input data (content) from the respondent(s), such as the uploaded video files, can then be sent to be stored in data storage (110). As part of step (110), as input (whether creator provided input or respondent provided input) such as content is stored, it is given a unique identifier (ID), for example a Uniform Resource Locator (URL), that reflects its storage location.

For example, each particular input may have its own unique ID such as a URL. Thus, step 110 can be executed after step 108 and/or after step 124. The project's database fields are then updated to record the unique storage location ID (112) of the different types of content, such as the content from the creator and the content from the respondent(s). At least one of the prompts sent to a respondent may be associated with a unique ID such as a tag, metadata, an/or other identifier, specific for such respondent. Videos provided by the respondent may also be associated with a unique ID designating which respondent submitted such video file, which prompt it is in response to, and/or designating a location in the master video where a corresponding master video segment is determined to be positioned. All stored content is retrieved and sent to be combined (e.g., concatenated) into a master video file including information reflective of the sequence that the content will be shown in a master video (114). Thus, the video played by running or accessing the master video file displays content in the proper order. The master logic algorithm is created based on creator provided input and a standard logic algorithm. As stated above, step (110) can also be done after step 124 such that the master video file may be created to include the respondents' video files after the respondents' video files are generated, and/or the master video file may be created before the creation of the respondents' video files, and/or the master video file may be created at the same time as the creation of the respondents' video files. The master video file can be created/overwritten multiple times using information from the master logic algorithm. The video editor platform uses the content input by the creator such as title or close messages, uploaded digital image files, questions, number of respondents, questions assigned to each respondent, set video response time limits, and/or other factors to generate the master video file. The master video file may correlate with the general form of the final video and when the final version of the master video file is executed or is accessed by a video playing software, it will display as the final video (or master video).

As part of step (114), based on the master logic algorithm, content input by the creator such as title or opening text, closing text, question text, digital image files, and/or other information will be added to the master video file such that when the master video file is run or accessed, the final video (i.e., master video) displays such input in the designated order. A database associated with the master video file may include placeholders (locations) correlated to inputs such as video segments, titles, question or other prompts, transitions, animations, introductions, ending portions, credits, and/or other elements via tags and/or metadata and/or other identifiers to keep track of such correlation. The placeholders are arranged pursuant to the master logic algorithm. Thus, the placeholders are correlated with a tag and/or metadata and/or other identifiers corresponding to such inputs.

In the example of a questionnaire video project, a database associated with the master video file may include placeholders (locations) for an introduction, prompt(s) (question, topic, etc.), as well as placeholders for one or more responses to the prompt(s), ending portion, and/or other elements. The placeholders for responses to a prompt may be associated with the prompt by, for example, a tag, metadata, and/or other identifiers as determined by the master logic algorithm. A first prompt may be labeled as prompt one, a second prompt labeled as prompt two, and so on. As derived by the master logic algorithm, the placeholders for responses following a prompt may be tagged according to the project title, prompt, the video respondent, and/or other information. For example, the placeholders for responses following prompt one may be tagged prompt one-respondent one, prompt one-respondent two, and so on in accordance with the master logic algorithm. In some embodiments, the prompt response tags or metadata may be associated with the prompts sent to the video respondents. A set of prompts sent to a respondent may be tagged with an identifier for that respondent. For example, a set of video prompts included in a video prompt file sent to respondent one may include identifiers for that respondent, such as prompt one-respondent one, prompt two-respondent one, and so on. The prompt identifiers and/or a related identifier may be associated with the video responses recorded for each prompt. The identifiers associate with each video prompt, such as prompt one—respondent one, prompt two-respondent one, and so on, and are used to place the video response in the appropriate location in the video associated with the master video file according to the master logic algorithm.

At any time after an initial master video file is created, a creator may review the master video file (such as by running it or accessing its data) on the video editor application (116). If necessary, at any time after the master video file is created, a creator may make edits (creator input) to the video segments associated with the master video file (118), which results in changes to the master video file. Any changes made to the master video file then results in the process of going back to step (110) so that steps (110), (112), and (114) are carried out once again in real-time. Thus, changes and/or updates made to the master video file are sent to be stored in data storage (110) which creates a new master video file ID (110) and/or new corresponding video segment IDs (110) that will be updated in the appropriate field(s) in the project database (112). A new master video file will then be generated (114). Original data, text, video and/or other files will be preserved so the creator may revert to those files if needed. Thus, the master video file can be modified with additional data resulting in a modified master video file which can be stored in a data storage location and master video identification data can be created in a separate file and/or updated in the project database to keep track of the original master video file and the modified master video file. New versions of the master video file generated by adding new respondent video files or edits made to the master video by the creator (input) will result in the generation of new versions of the master video file for storage in the data storage location and this may rewrite the previous version's unique ID for the master video file or store new versions of the master video file with different unique IDs. Once stored, the unique ID(s) will be updated in the appropriate place(s) in the project database.

In various embodiments, invitations, questionnaires (e.g., prompt data), and/or other information are created using creator provided input that are then provided to one or more video respondents as part of step (120). The video respondents receive the invitation, questionnaires, web link and/or other information at, for example, a mobile device application, email client, or text interface. The invitation message may include but is not limited to: a description of the video, the topic, a set of questions, prompts, deadline, and/or instructions to record video responses, and the like to be sent to the respondents.

The invitation may contain a link to open a browser where they may receive more instructions and/or record and upload their video responses. In some instances, the prompt files are sent to the respondents via an application associated with the video creation platform. For example, each of the respondents may be prompted to open a link in a browser or have an application installed on their mobile device, desktop, and/or other computer. The application may be configured to output the prompts, questions, topics, and the like, for the respondents to review. The respondents may record video responses to the prompts sent and the video responses (video clips) are generated by a phone or video camera, photo camera, and/or any device with video recording capabilities as part of step (122). Once the video respondent has completed recording video responses, the video responses are uploaded to the video editor application as part of step (124). All discrete video response file submissions result in the creation and storage of new video files per step (110). A video response may be associated with a tag, metadata, and/or other information that designates a location in the master video (corresponding to the master video file) where such video response is to be played. Such location is determined according to the master logic algorithm. For example, a video response may be tagged prompt one-respondent one, and that tag may be used to modify the master video file such that the master video corresponding to the master video file plays the video response in an appropriate location following prompt one in the master video. The video response tagged prompt one—respondent one may be placed before and/or after a video response tagged prompt one—respondent two. Thus, one of the prompts sent to a respondent may be associated with a tag, metadata, and/or other identifier specific for such respondent. Also, each video file may be associated with a tag, metadata, and/or other identifier designating which respondent submitted such video file, which prompt it is in response to, and/or designating a location in the master video where a corresponding master video segment is determined to be positioned.

As video responses are received at the video editor application, the video responses go through steps (110)-(114): each video file (content) is received, sent to be stored in data storage where it is stored and assigned a unique ID (110), the ID's are updated in the project database (112), the newly stored video files are retrieved and sent to be combined into the master video file based on a designated placeholder in a database as determined by the master logic algorithm (114). The master video file may be continuously and/or automatically populated with video response files from various respondents. In certain cases, the master video file may be populated with video response files continuously until all responses are received from the various respondents. Video response files are continuously added to the master video file as they are received. Each discrete video file response submission results in the creation and storage of a new version of the master video file as those video files are added to a master video file. As respondents upload video responses, the corresponding files are added to the master video file in a way that those video files will play as master video segments in a formulated location of the master video as directed by the master logic algorithm.

For example, respondent one's video response to question one may be placed after the video segment with text for question one, respondent two's video response to question two will be placed after respondent one's video response to question one and so on.

Various events may trigger the end of the collecting of new video responses (126), including but not limited to a determination that all prompts have been answered, the video editor has received all of the video responses from the video respondents, a predetermined time has elapsed, a designated number of responses has been fulfilled (such as a certain number of video files being received), the video creator has initiated finalization and/or sharing, and/or another triggering event has occurred. For example, the creator may set a deadline of one week for each respondent to complete their questionnaire at which time the questionnaire will be closed. In other cases, the creator may indicate to close the questionnaire after a designated number of respondents has participated. For example, the creator may have invited 20 respondents indicating that participation was open to the first 10 who respond. In this case the questionnaire would be closed after the tenth participant had uploaded their video responses.

The creator may review the master video corresponding to the master video file and if needed, make final edits, and/or save the master video as final (128). The video editor application may, for example, automatically edit the master video by making edits to the master video file. The video editing application may perform one or more operations to generate a final master video with professional transitions, consistent video quality, consistent audio levels, and/or other hallmarks of a high-quality video. The master video may be edited by, for example, smoothing transitions between video responses. Various video responses may include different video quality, volume levels, brightness, contrast, and/or other attributes. The video editor application may automatically apply video editing techniques to the master video segments to improve the quality of the master video segments and/or normalize the master video segments relative to one another. In some embodiments, during finalization, the creator may manually edit the master video. The video editor may for example include any of the features commonly available in video editors known in the art. At the direction of the creator the completed video may be shared (130). In the present description, to "share" a master video file means to provide or make accessible. Nonlimiting examples of "sharing" a master video file include allowing the downloading of the master video file (e.g., directly from the video editing application or such as by sending a link from which it can be downloaded), sending the file (such as via email or other communication method), or otherwise making the master video file (or a link to the master video file) accessible via electronic transfer, email, posts to social media, secure file transfer, and/or any mechanisms of sharing media. When a video is "shared", this means that a file that can be used to play the video (such as a master video file) is "shared".

Figure 2:
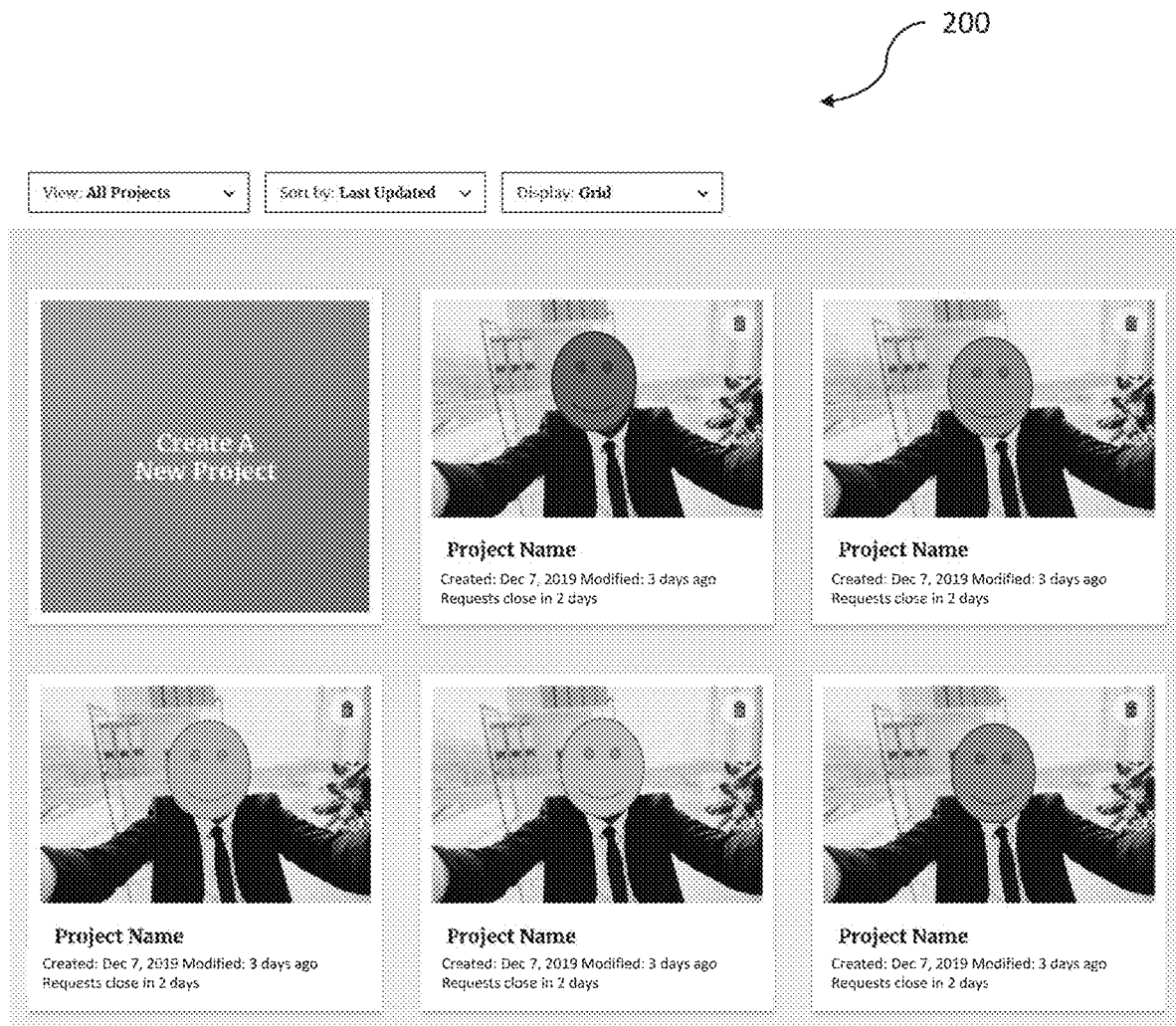
FIG. 2 illustrates an interface that enables creation of a new video project and/or interaction with multiple video projects according to various embodiments.

FIGS. 2-6 depict exemplary interfaces for automatic generation of video content. FIG. 2 illustrates an interface that enables creation of a new video project and/or interaction with multiple video projects according to various embodiments. In the example shown, a video project interface 200 may be associated with a video editor application. The video projects shown include videos generated using the techniques disclosed herein. A creator may monitor the status of an open project or click on the projects to view and/or edit previously generated projects. A creator may also use the interface to initiate the process to create a new video. For example, the creator may click on "Create a New Project," and the video creation process begins.

FIG. 3 illustrates an interface for configuring a video production project according to various embodiments. In the example shown, an interface for video project setup 300 allows a creator to setup a video project. A question generation interface 302 is provided to allow a creator to enter one or more questions for video respondents. In the example shown, questions for a product survey video are entered, including questions such as "What's your favorite use for the product?" and other similar questions. The question generation interface 302 may guide the creator in generating questions for the video project. A project type selector may provide the creator with a preset group of questions to select from. For example a product review project type might offer questions such as: "What is your favorite use for the product?", "How has the product made your life better or easier?" and other related questions. A video template interface would allow the creator to select and/or define a template for the video. For example, the creator may define one or more predefined templates, and these templates may be used for multiple video projects. The video templates may define styles for the beginning and ending of the video, the question prompts, transitions between sections of the video, creator specific brand messaging, standard logic algorithms, and/or other elements of the video. The video templates may also contain creator specific brand or messaging. The video template may be used to provide standard logic algorithms for use in connection with the creation of the master video file.

A video response deadline interface 304 is provided. The creator can set a time and/or date for completion of the video responses, a deadline for completion of the video response based on the number of responses, and/or another deadline. An interface 306 to generate invitation messages to the video respondents is provided. The invitation message may include a description of the video, the questionnaire, instructions to record video responses, and/or similar information. Upon completion of the various fields in the video project setup interface 300, the video project may be initiated and sent to the computer system for creation of a master video file and/or the creator may proceed with inviting selected participants (308).

Figure 4:
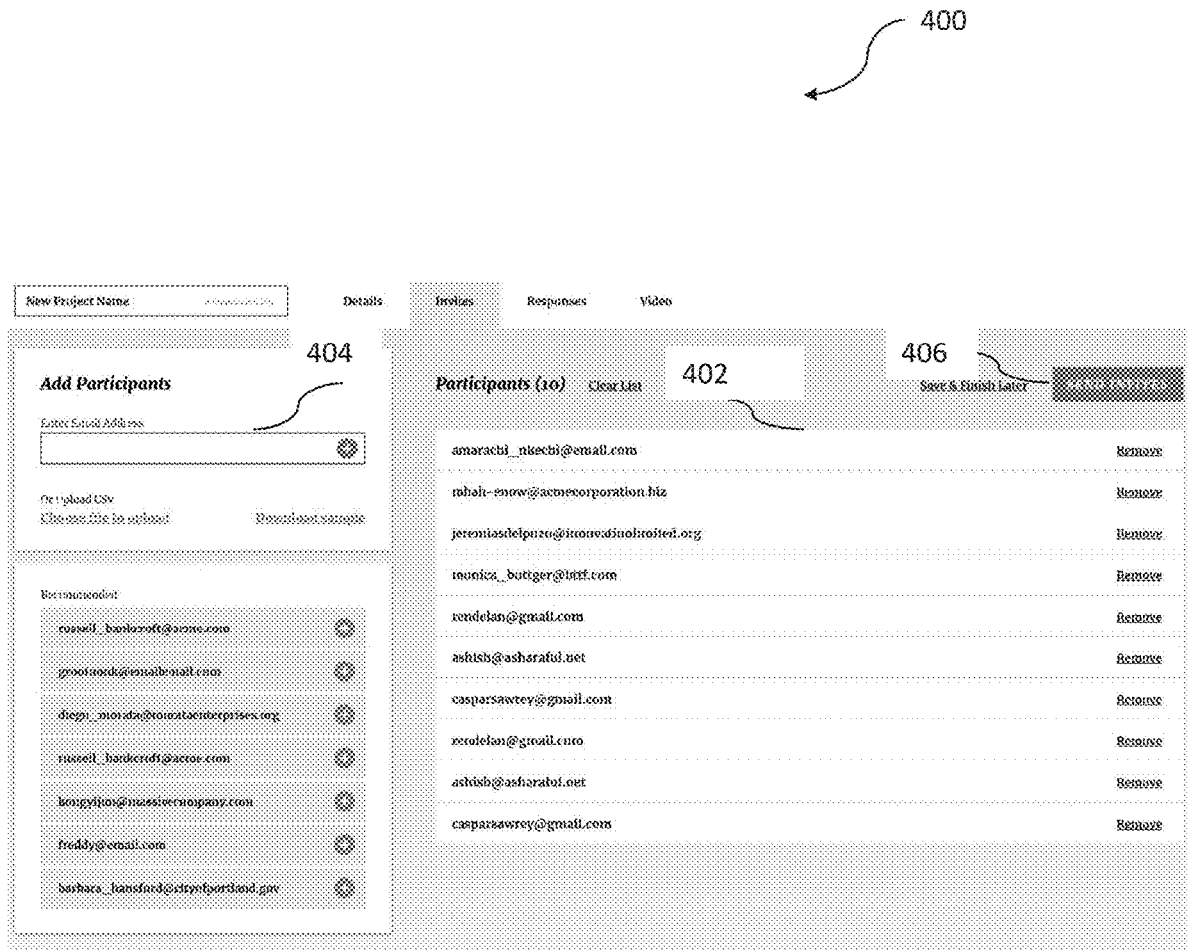
FIG. 4 illustrates an interface for distributing video response prompts according to various embodiments.

FIG. 4 illustrates an interface for distributing video response prompts according to various embodiments. In the example shown, an interface 400 is provided for a creator to enter of a list of video respondents. The list of video respondents may include a list of email addresses or other contact information such as phone number or title, each associated with a video respondent (402). Video respondents may be added individually; via a spreadsheet, CSV file, or other file; ingested from an address book; and/or otherwise added to a list of video respondents (404). In certain cases, the video respondents are assigned to groups. A group of respondents may be associated with a particular set of questions. For example, respondents in a first group are setup to receive a first group of questions, respondents in a second group to receive a second set of questions, and so on. The groups of questions may include overlapping questions. Upon completion of the various fields in the interface for distributing video responses 400, the video project may be initiated and sent to the computer system (406).

Figure 5:
FIG. 5 illustrates an interface for viewing and editing combined video according to various embodiments.

FIG. 5 illustrates an interface for viewing and editing combined video according to various embodiments. In the example shown, an interface 500 is provided for a creator to view, edit, and/or interact with a video project. In the example video shown, based on the master logic algorithm the video editor has automatically inserted introduction ("Beginning" that contains creator provided opening message text and digital image file), questions ("Title Question 1"), and video responses into a master video file along with information of location in a master video corresponding to the master video file since the master video file can be run or accessed to play the master video. The video responses HCaufield 01 and Bphillips 01 are recorded video responses to Question 1. For example, the Hcaufield and Bphillips are respondents that received a questionnaire including Question 1, and recorded video responses. The video responses, Hcaufield 01 and Bphillips 01, are automatically entered into the master video at the location indicated by the master logic algorithm. The master video may be continuously updated as further responses are received. The interface 500 may also be used to edit, trim, modify, or enhance the master video file at any time prior to finalization. Upon completion of the video in the interface 500, the creator may share the video.

Figure 6:
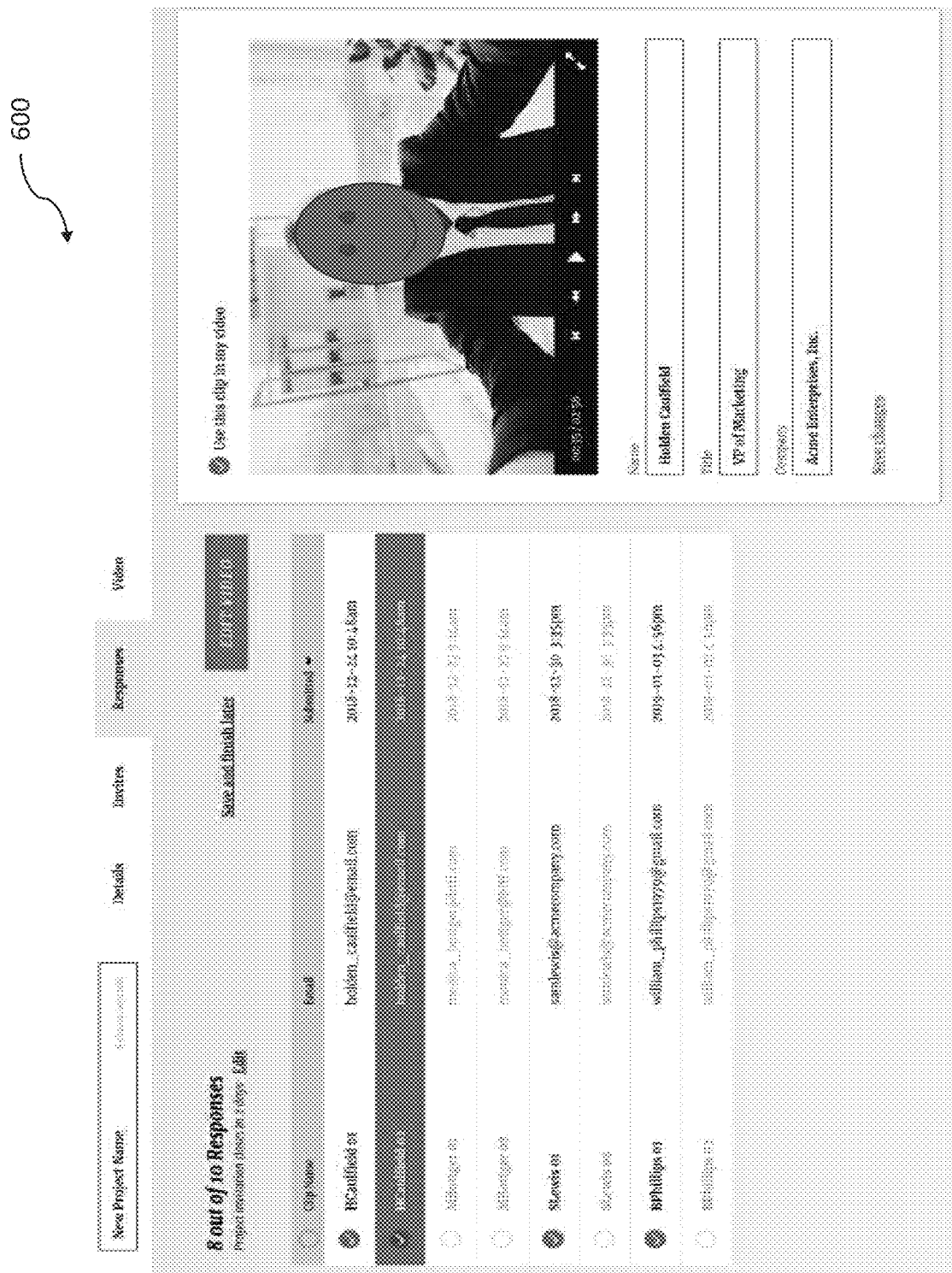
FIG. 6 illustrates an interface for monitoring video responses according to various embodiments.

FIG. 6 illustrates an interface for monitoring video responses according to various embodiments. At FIG. 6, an interface 600 is provided to monitor the status of video responses from one or more video respondents (e.g., video subjects). The interface provides status of the completion of video responses for each video respondent. The interface 600 may be used to track the video responses and follow up with respondents as appropriate. The interface 600 may also be used to update or edit a respondent's name and/or associated contact information in the event it should appear in the video. The interface 600 may also be used to edit, trim, modify, or enhance video segments (clips) at any time prior to finalization. All video response segments will automatically be added to the master video to a location as determined by the master logic algorithm. The creator, however, may decide not to include all video responses in the master video and has the discretion to do this. The interface 600 may also be used to select which video response segments should be included in the master video. As shown, two responses have been included from video respondent HCaufield—HCaufield 01, HCaufield 02—one response from respondent SLewis, and one response from BPhillips.

Figure 7:
FIG. 7 illustrates a mobile device interface for recording a video response according to various embodiments.
Figure 8:
FIG. 8 illustrates a mobile device interface for editing and submitting a video response according to various embodiments.
Figure 9:
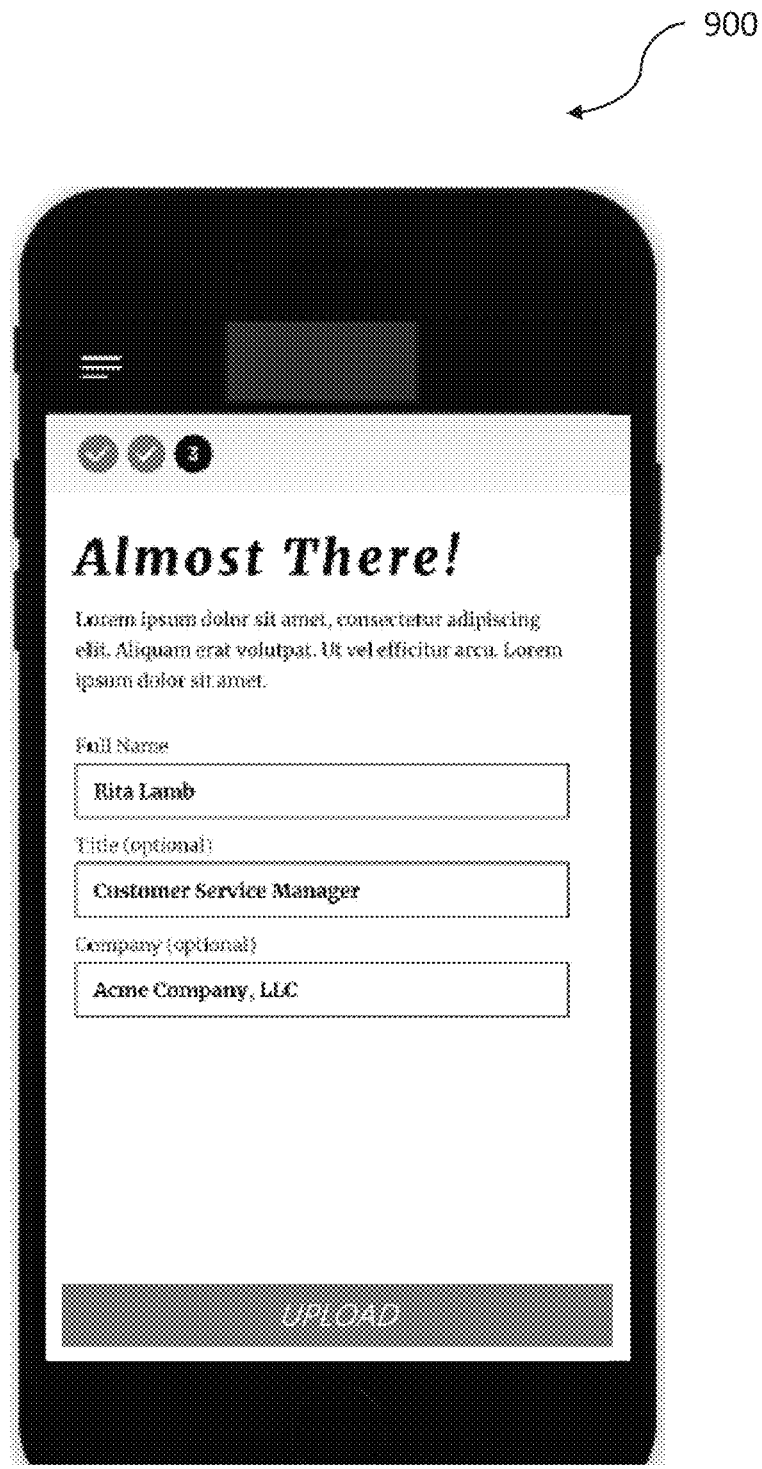
FIG. 9 illustrates a mobile device interface for finalizing and submitting one or more video responses according to various embodiments.

FIGS. 7-9 depict the process of generating and submission of video content. FIG. 7 illustrates a mobile device interface 700 for recording a video response according to various embodiments. The present invention, however, is not limited to a mobile device and any recording device can be utilized. In the example shown, a video prompt (question) interface 702 and video response interface 704 are depicted. A video respondent may receive an invite to provide responses to one or more prompts, as discussed herein. The invite may provide a link to one or more prompts (questions) for video responses. The video prompt interface 702 may display a question for the video respondent to answer. The video respondent may evaluate the question and record a response to the prompt. The video response may be recorded in a video response interface 704 including video recording functionality. The video response interface 704 may allow a respondent to record a response to the prompt, apply effects to the video response, and otherwise create a video response. Such video response may be saved or stored locally prior to being sent back to the video creator. In certain cases, prompt and answer interfaces 702, 704 are provided for each of multiple prompts (questions) provided to the respondent.

FIG. 8 illustrates a mobile device interface for editing and submitting a video response according to various embodiments. This is only one mechanism of recording and storing the videos, and others can be used in connection with the present invention. In the example shown, an interface 800 is provided for a video respondent to re-record or edit their video response. The video response may be re-recorded or the video respondent may shorten, crop, adjust, apply effects, and/or otherwise edit their response. When satisfied with the video response, the respondent may advance to a next prompt and record additional video responses. Upon completion of all video response(s), the response(s) will be uploaded to the video editor platform for further processing as described herein.

FIG. 9 illustrates a mobile device interface for finalizing and submitting one or more video responses according to various embodiments. In the example shown, an interface 900 is provided for a video respondent to finalize and submit video responses, provide or verify personal information, and enter other information. The video responses may then be uploaded for inclusion in the video project.

Figure 10:
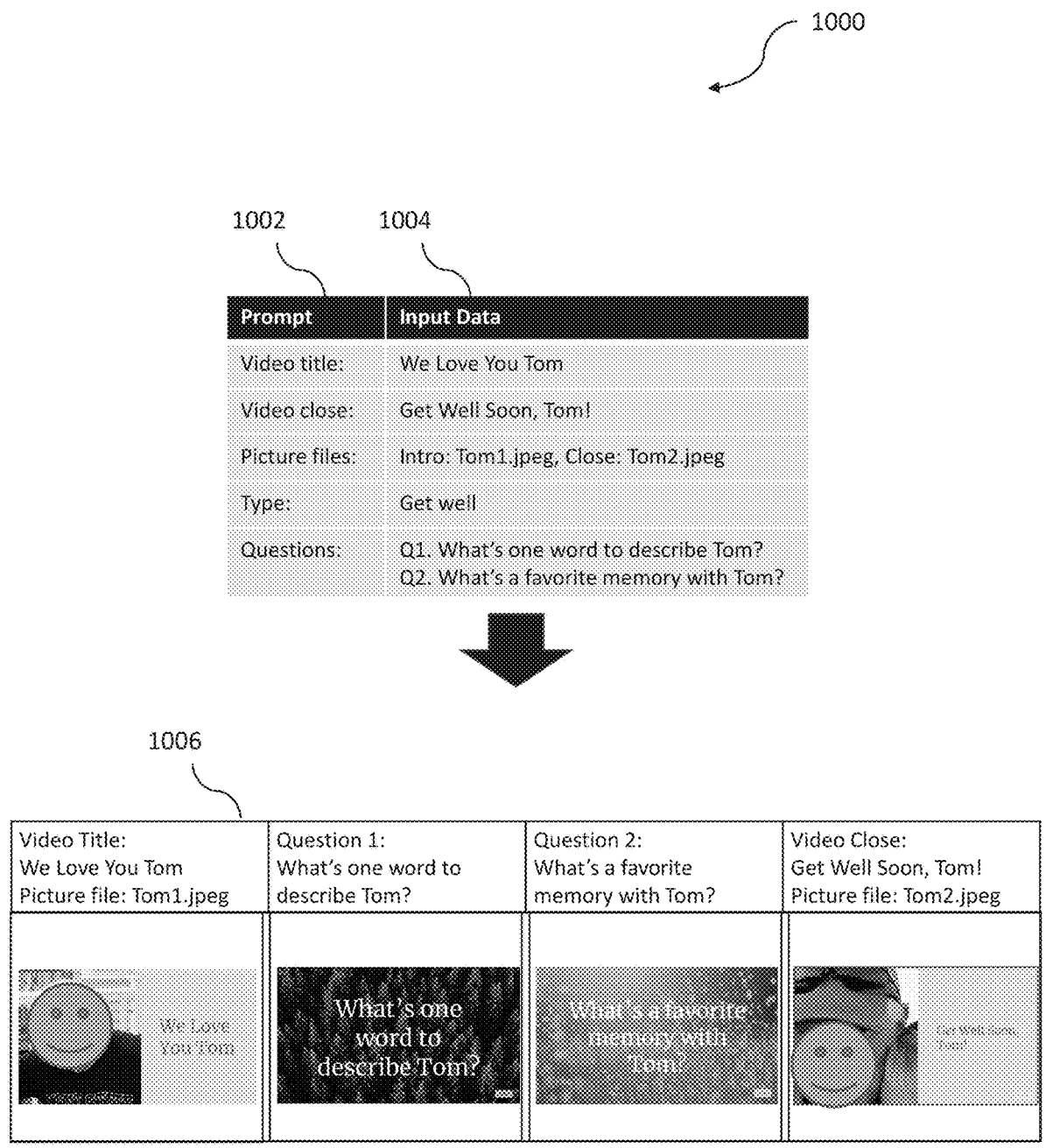
FIG. 10 illustrates how text and digital image file information provided by a creator will be rendered into a master video.
Figure 11:
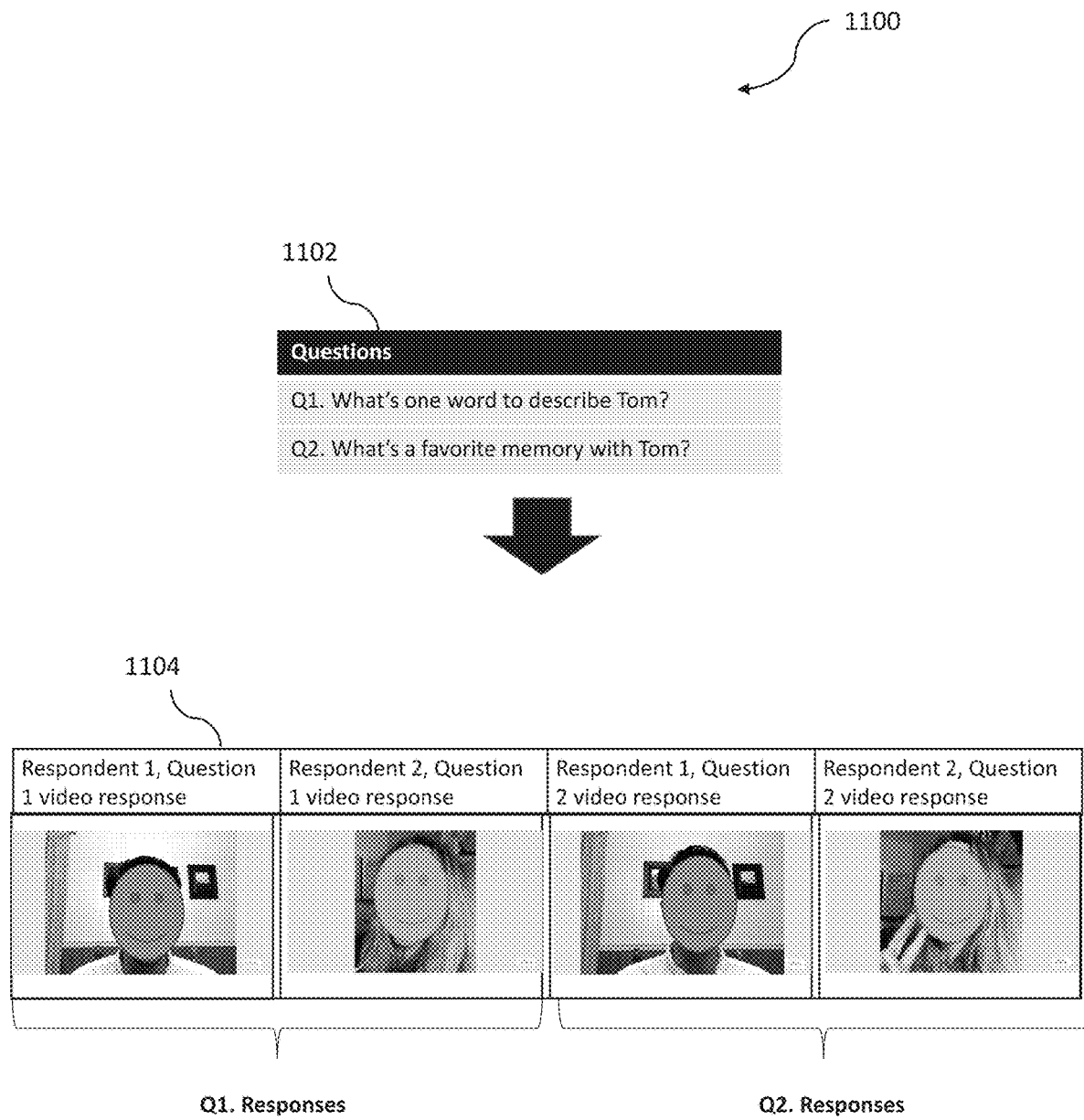
FIG. 11 illustrates how videos responses provided by respondents are combined into a master video file.

FIGS. 10-12 depict the process of creators and respondents providing input to the video editor application that are automatically placed in the proper position within the master video based on the master logic algorithm. FIG. 10 illustrates how text and digital image file information provided by a creator will be placed into a master video (as based from a master video file). The process (1000) will be described with reference to creation of a get-well survey video. In the example shown the creator is prompted by the interface to provide responses to a series of questions (1002) such as the video title, video closing message, to upload digital image files to be used in the master video file, a type of project, and selection of questions for respondents to respond to and/or other information. The selection of "get well" project type may automatically provide a pre-set list of associated questions for the creator to select from. The creator provides input data (1004) in response to the prompts. When the project is initiated the creator provided input (content) is submitted to the computer system and combined into the master video file in a way such that the associated master video will show such input in a formulated sequence determined by the master logic algorithm. In this example, step (1006), which is based on the master logic algorithm, can designate the video title "We Love You Tom" with the designated intro digital image file "Tom1.jpeg" to create the intro clip which is placed before the video clip for question 1 text "What's one word to describe Tom?", which is before the video clip for question 2 text "What's a favorite memory with Tom?", which is then followed by the closing video clip that has a message "Get Well Soon, Tom!" and designated close digital image "Tom2.jpeg". Video type preferences may determine, for example, transitions between the questions and video responses, filters applied to the video, video effects, fonts, logos, background colors, and/or other attributes of the video. Preset or standard backgrounds may be used for the question text master video segments such as those applied in the example shown. There may be presumed spaces where video responses to question one and question two will be placed upon being uploaded to the video editor application.

FIG. 11 illustrates how video response files provided by respondents are combined into a master video file (1100) and arranged in a master video. As described herein, questions are provided to video respondents as directed by the project creator (1102). The video respondents record responses to the questions and upload them to the video editor application. As the responses are received at the video editor application, the video files corresponding to the video responses are automatically added to the master video file based on the master logic algorithm. In the depicted example, video responses 1104 are shown. Such video responses 1104 are organized in the master video such that the video response to question one from respondent one precedes the video response to question one from respondent two in the master video. The responses to question one are then followed by the responses to question two with the same logic. In this example the video files are combined in the master video file such that the resulting master video has an arrangement which includes grouping and displaying all responses to question one prior to grouping and displaying all responses to question two. In the case where multiple video responses to the same question are recorded by different video respondents, the video responses may be placed in the master video in a predefined order, random order, and/or using other approaches as directed by the master logic algorithm.

In one example, video respondents may each be assigned a weight, and the video responses may be placed in the master video according to the weight associated with the video respondent. A first respondent may be weighted higher than a second respondent, and the first respondent's answer may be placed first in the master video. In another example, video responses to a question may be placed in the master video in order of length of response. For example, the longest video response may be placed first, followed by the next longest, and so on. The master video may be automatically populated with questions and responses until all responses are received, a predetermined time has elapsed, the creator closes the project, and/or another event occurs.

FIG. 12 illustrates how both creator and respondent provided content is combined into the master video file such that such content appears in a formulated location within a master video. In the example shown (1200), the creator provided content from step (1000) as well as the respondent provided content from step (1100) have been uploaded and placed into the master video file such that they will appear in the appropriate places of the master video as directed by the master logic algorithm. The combined draft of the master video file may include all data corresponding to elements of the creator and respondent provided content including the project title and digital image for the title as a video clip, the question text clip followed by the related video responses, repeated for additional questions and responses, followed by a closing message with the closing digital image as a video clip, and/or other elements. The video editor application may automatically edit the draft master video file as discussed herein. The creator may also use the video editor application to edit the master video file. When complete, the master video file may be shared.

Exemplary Computer Architecture

Figure 13:
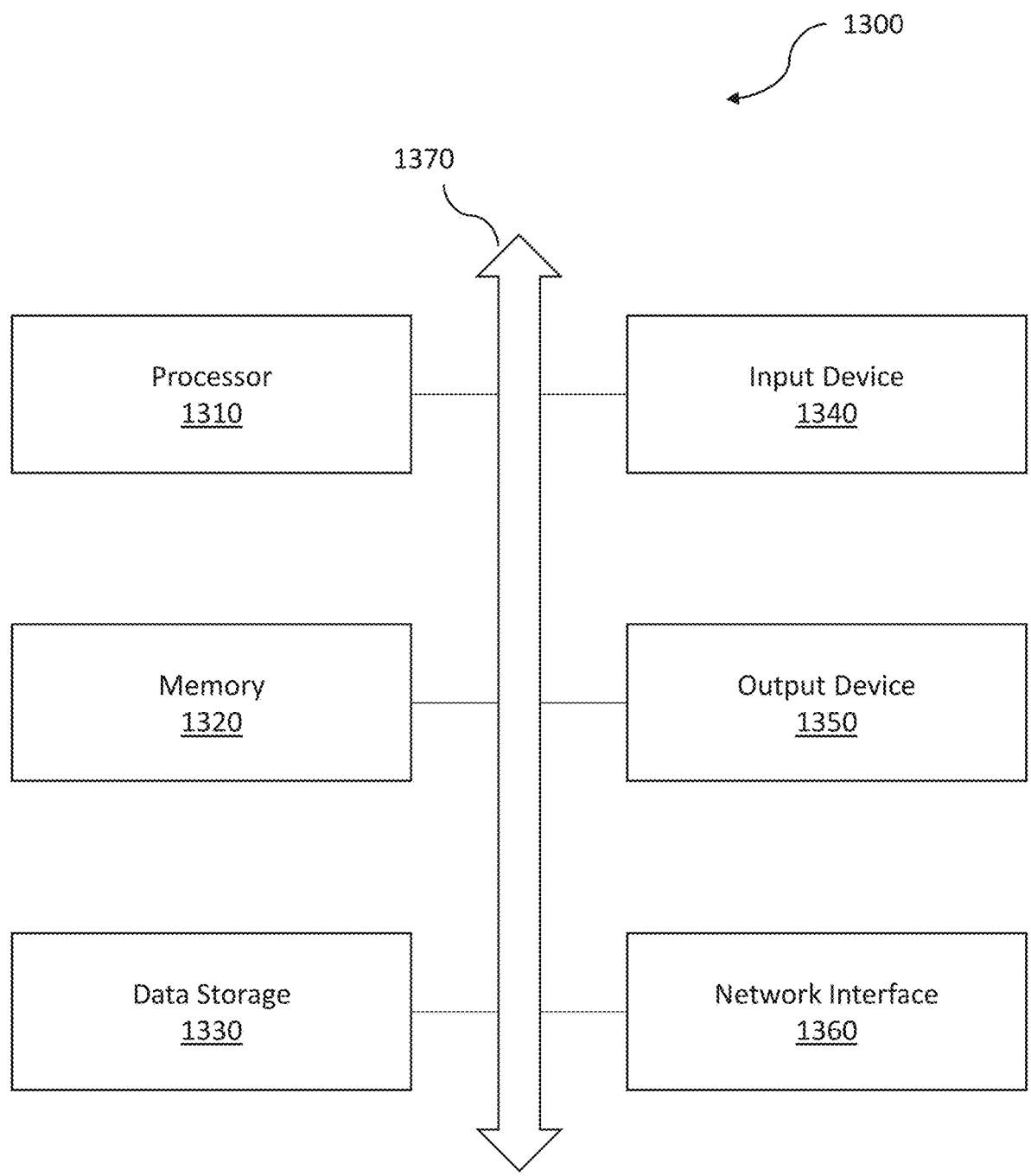
FIG. 13 illustrates an example computer system which can be used to perform video content generation techniques in accordance with an embodiment of the invention.

The description above discloses methods of video generation, including FIGS. 1-12. Such methods can also be implemented with a system. FIG. 13 illustrates an example computer system which can be used to perform the video content generation techniques disclosed herein. A computer system 1300 may include a computing device running the video generation application described above and in FIGS. 1-12, and/or any other computing systems contemplated by the present disclosure. With reference to FIG. 13, computing system 1300 includes one or more processors 1310, one or more memories 1320, one or more data storages 1330, one or more input devices 1340, one or more output devices 1350, network interface 1360, one or more optional peripheral devices (not shown), and one or more communication bus 1370 for operatively interconnecting the above-listed elements. Processors 1310 can be configured to implement functionality and/or process instructions for execution within computing system 1300. For example, processors 1310 may process instructions stored in memory 1320 or instructions stored on data storage 1330. Such instructions may include components of an operating system or software applications necessary to implement the methods as described above.

Memory 1320 can be configured to store information within computing system 1300 during operation. For example, memory 1320 can store instructions to perform the methods for initiating, processing, and finalizing a video project as described herein. Memory 1320, in some example embodiments, may refer to a non-transitory computer-readable storage medium or a computer-readable storage device. In some examples, memory 1320 is a temporary memory, meaning that a primary purpose of memory 1320 may not be long-term storage. Memory 1320 may also refer to a volatile memory, meaning that memory 1320 does not maintain stored contents when memory 1320 is not receiving power. Examples of volatile memories include RAM, dynamic random access memories (DRAM), static random access memories (SRAM), and other forms of volatile memories known in the art. In some examples, memory 1320 is used to store program instructions for execution by processors 1310. Memory 1320, in one example, is used by software applications or mobile applications. Generally, software or mobile applications refer to software applications suitable for implementing at least some operations of the methods as described herein.

Data storage 1330 can also include one or more transitory or non-transitory computer-readable storage media or computer-readable storage devices. For example, data storage 1330 can store instructions for processor 1310 to implement the methods described herein. In some embodiments, data storage 1330 may be configured to store greater amounts of information than memory 1320. Data storage 1330 may be also configured for long-term storage of information. In some examples, data storage 1330 includes non-volatile storage elements. Examples of such non-volatile storage elements include magnetic hard discs, optical discs, solid-state discs, flash memories, forms of electrically programmable memories (EPROM) or electrically erasable and programmable memories, and other forms of non-volatile memories known in the art.

Computing system 1300 may also include one or more input devices 1340. Input devices 1340 may be configured to receive input from a user through tactile, audio, video, or biometric channels. Examples of input devices 1340 may include a keyboard, keypad, mouse, trackball, touchscreen, touchpad, microphone, video camera, image sensor, fingerprint sensor, iris scanner, scanner, or any other device capable of detecting an input from a user or other source, and relaying the input to computing system 1300 or components thereof.

Output devices 1350 may be configured to provide output to a user through visual or auditory channels. Output devices 1350 may include a video graphics adapter card, display, such as liquid crystal display (LCD) monitor, light emitting diode (LED) monitor, or organic LED monitor, sound card, speaker, lighting device, projector, or any other device capable of generating output that may be intelligible to a user. Output devices 1350 may also include a touchscreen (also referred to as touch-sensitive or touch-responsive displays), presence-sensitive display, or other input/output capable displays known in the art.

Computing system 1300 can also include network interface 1360. Network interface 1360 can be utilized to communicate with external devices via one or more communications networks such as a communications network or any other wired, wireless, or optical networks. Network interface 1360 may be a network interface card, such as an Ethernet card, an optical transceiver, a radio frequency transceiver, or any other type of device that can send and receive information.

An operating system of computing system 1300 may control one or more functionalities of computing system 1300 or components thereof. For example, the operating system may interact with the software or mobile applications and may facilitate one or more interactions between the software/mobile applications and processors 1310, memory 1320, data storages 1330, input devices 1340, output devices 1350, and network interface 1360. The operating system may interact with or be otherwise coupled to software applications or components thereof. In some embodiments, software applications may be included in the operating system.

The computer system (which can be referred to as just a system) identified above can have certain characteristics. For example, in such system, one or more data storage devices 1330 or memory 1320 (the data storage device 1330 or memory 1320 may be computer readable media) may include instructions stored therein. When such instructions are executed by the one or more of the processors 1320, this causes the processors 1320 to perform operations including: receiving input from a video creator that initiates a video project, soliciting video file responses from respondents, and receiving one or more video file(s) from each of the respondents. The operations of the processors can also include combining the video files into a master video file, where the master video file corresponds to a master video and each of the video files corresponds to a master video segment, and where the relative position of each of the master video segments in the master video relative to one another is based on a formulated sequence.

Figure 14:
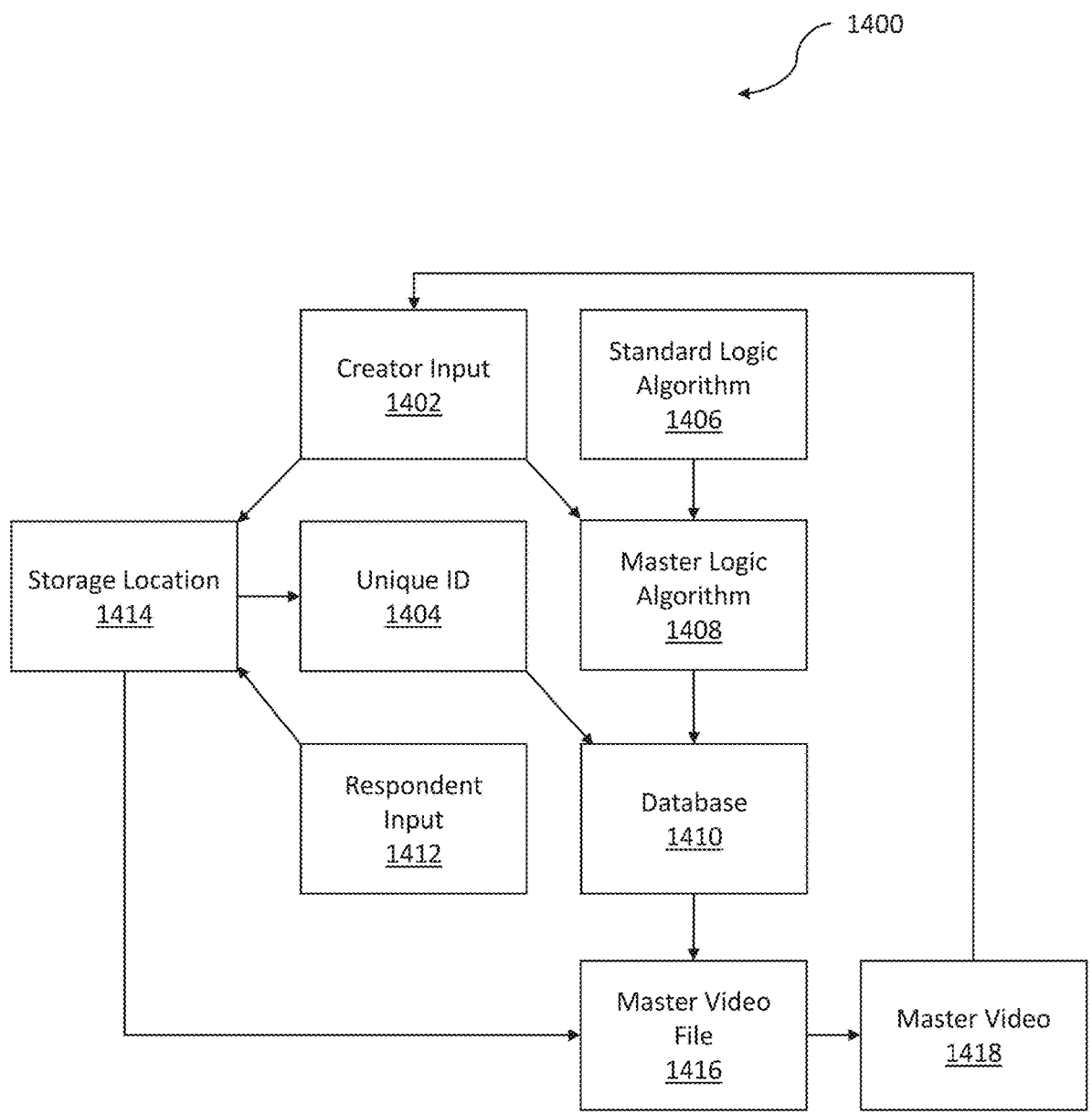
FIG. 14 illustrates an example of an embodiment of the present invention indicative of the automatic generation of video in real time.

FIG. 14 shows a graphical representation of an embodiment of the present invention in which video can be generated automatically in real time (1400). The instructions (e.g., software) associated with the creation of the video project may be saved in a computer readable media and can be implemented by a system that contains a processor to execute such instructions. A video creator may provide creator input 1402. Such creator input 1402 may be in the form of text data, digital image files, video data (in the form of video files), and other data, and may be provided by the video creator directly (by providing, for example actual text, digital images, or video), or indirectly (by making certain choices in the video application such as choosing standard questions for a particular project). The creator input 1402 may also be in the form of making edits to the master video 1418, which would trigger the process 1400 to effectuate such edits to the master video. Each discreet item of creator input, such as the title of the project, or a digital image, is automatically sent to be stored at a storage location 1414 where it is automatically assigned a unique ID 1404, such as a URL (technically speaking, the storage may take place at the URL's corresponding address/location at a server which houses the URL). The standard logic algorithm 1406 which may be specific to the particular project chosen by the video creator, reflects standard desired locations in a master video for certain things such as the project name, opening message, closing message, etc. The creator input 1402 may also include information which has a bearing on the location of content (i.e. master video segments) in the master video 1418.

Accordingly, the master logic algorithm 1408 reflects the location information associated with the creator input 1402 and the standard logic algorithm 1406, and is updated as new creator input 1402 is entered. The information from the master logic algorithm 1408 is utilized to automatically create (or modify) a database 1410 which may partially, or, preferably, include placeholders for every possible (within reason) master video segment in the master video 1418 in the order specified based on the master logic algorithm 1408. The term "master video segments" is used to denote discreet portions of the master video, and can include an image of a question, or can include a video with sound and motion, etc. Such database 1410 (which may also be referred to as a "project database") directly or indirectly has access to the unique IDs 1404, such as URL's, in order to automatically reflect a correspondence between the sequence of master video segments desired in the master video 1418 with the data corresponding to such master video segments (such as video files or data associated with the video files which has been combined into the master video file). When respondents provide respondent input 1412 such as videos, each such discreet item of respondent input 1412, such as a video, is automatically stored at the storage location 1414, and also automatically assigned a unique ID 1404, such as a URL (e.g., the URL address at the URL server).

As new inputs are entered by the video creator and/or the respondents 1402, 1412, they may be automatically stored in the storage location 1414, new IDs 1404 are automatically created, and the database 1410 is updated automatically to reflect a correspondence between the placeholders in the database 1410 and the unique IDs 1404 such that the database always reflects the appropriate order for the master video segments (for the master video) corresponding to the inputs 1402, 1412. This enables a real-time cascading effect continuously storing input, assigning new unique IDs as indicated, updating the database, creating new version(s) of the master video file that will be reflected in the master video versions. Not every placeholder in the database 1410 may have a corresponding ID 1404. For example, if a respondent does not submit any videos, there will be no corresponding IDs 1404 corresponding to videos from such respondent since they were not submitted (e.g., because they never will or have not been submitted yet). In such a situation, placeholders in the database 1410 which correspond to such videos which are not submitted would contain a null ID and not reflect any unique IDs 1404. In such a case, only some of the placeholders in the database 1410 would reflect a correspondence with the unique IDs. Since the placeholders are reflective of the appropriate sequence of, preferably, every possible master video segment, placeholders with a null ID or lacking unique IDs can be "ignored" and the database 1410 will reflect the appropriate order for master video segments for which unique IDs 1404 do exist. Accordingly, the information from the database 1410 can be used to automatically combine the input data stored in the storage location 1414 to create a master video file 1416 at any time which reflects the inputs 1402, 1412 that have been received at that point in time and which reflects the order that the master video segments should be displayed in the master video 1418.

The master video file 1416 can be executed or otherwise accessed by other software to display the master video 1418 and in which the master video segments appear in the correct order since such "correct order" information is automatically reflected in the master video file 1416 based on the information from the database 1410 which has been automatically correlated to the master logic algorithm 1408. This results in the amazing ability of the video creator to be able to display the master video 1418 at any time, with very little effort or editing skill required, to see its progress and can make decisions on whether to distribute it at that time, to make edits, or take other actions. Thus, the present invention not only allows the automatic generation of video, which is a great advantage, but also allows the automatic generation of video in real time based on varying parameters as additional inputs are incorporated into the process in real time, resulting in a huge technological leap compared with existing video generation tools currently in existence.

EXAMPLE 1

A video creator decides to create a video for their cousin Tom. The creator logs on and creates a new project giving it the name "We Love You Tom". The software creates a new project table (otherwise referred to as a projects database), sends the title data (or content) "We Love You Tom" to a new storage location (such as with Amazon S3) to store project media (otherwise referred to as content) where it is given a unique ID, the unique ID is then updated in the corresponding project reference field (otherwise referred to as a placeholder) in the project table. On the new project screen under "type of project" the creator selects "get well". The software provides an automated list of default (standard) questions associated with a "get well" project type as well the ability to customize the questions if the user desires. The creator reviews a list of related possible questions to ask participants and selects two.

The software stores those two questions as plain text data (content) in the storage location where they are assigned unique IDs, the unique IDs are then updated in the relevant project reference field in the projects database and upon master video creation, based on the master logic algorithm, they will be positioned in the master video where indicated. As prompted, the creator provides the closing message: "Get Well Soon, Tom!" and uploads some digital image files (e.g., "content") of cousin Tom for the opening and closing of the master video. The software stores the closing message, and digital image files for the opening and closing in the storage location where they are assigned unique IDs, the unique IDs are then updated in the relevant project reference field in the projects database. The software associates the closing message and content in the relevant project reference fields in the projects database and upon master video creation, based on the master logic algorithm, these will be positioned in the master video where appropriate.

The creator sets a deadline of, say, May 5 for all responses to be submitted. The software stores the deadline with a unique URL and stores it for use where indicated in the invitation. The corresponding URL that each participant receives in their email invitation may be set to expire at the deadline provided. Next, the creator reviews and edits the pre-populated invitation to participants to ensure the message is accurate. The software stores the revised invitation in the storage location where it is assigned a unique ID, the unique ID is then updated in the relevant project reference field in the projects database. The creator then provides a list of participants' names with their contact information so they may be invited to participate and clicks to send the invites. The software sends out invitations to all participants provided using the saved invitation.

The software creates a master video file using the stored content provided by the creator. Participants open their invitations, click on the link and go to the URL provided in their browser. The software provides instructions on how to record their videos. Participants record their videos and upload them. The software uploads the videos to the project storage location (such as S3) where each video file (content) is given a unique URL that then replaces a null placeholder ID in the projects table based on the master logic algorithm. Such videos are then placed into the master video where appropriate. Each time a participant submits a video, the software creates a new master video file that includes/reflects all of the other video files.

The creator views the master video (based on the master video file) and sees the opening message "We Love You Tom" with a digital image of cousin Tom, a transition that shows the text of question one, then all the participants' response videos for question one are loaded to the appropriate location, followed by a transition that shows the text for question two, then all the participants response videos for question two are loaded to the appropriate location, and then the closing message "Get Well Soon, Tom!" with a digital image of cousin Tom.

The creator makes some minor trimming edits to two of the video segments. The software creates a new copy of those master video segments in the project storage location (such as S3) preserving the original master video segment files. The projects table tracks the new edits and a new master video file is created/updated reflective of the edited videos instead of the originals. Once the master video (based on the master video file) is deemed complete the creator is able to share the completed video.

Present techniques may be implemented using a variety of technologies, including computer software, electronic hardware, or a combination thereof, depending on the application. Electronic hardware can refer to a processing system, such as a computer, workstation or server that includes one or more processors. Examples of processors include microprocessors, microcontrollers, Central Processing Units (CPUs), digital signal processors (DSPs), field programmable gate arrays (FPGAs), programmable logic devices (PLDs), state machines, gated logic, discrete hardware circuits, and other suitable hardware configured to perform various functions described throughout this disclosure. The term "processor" is intended to include systems that have a plurality of processors that can operate in parallel, serially, or as a combination of both, irrespective of whether they are located within the same physical localized machine or distributed over a network. A network can refer to a local area network (LAN), a wide area network (WAN), and/or the Internet. One or more processors in the processing system may execute software, firmware, or middleware (collectively referred to as "software"). The term "software" shall be construed broadly to mean instructions, instruction sets, code, code segments, program code, programs, subprograms, software components, applications, software applications, mobile applications, software packages, routines, subroutines, objects, executables, threads of execution, procedures, functions, etc., whether referred to as software, firmware, middleware, microcode, hardware description language, and the like. If the embodiments of this disclosure are implemented in software, it may be stored on or encoded as one or more instructions or code on a non-transitory computer-readable medium. Computer-readable media includes computer storage media. Storage media may be any available media that can be accessed by a computer. By way of example, and not limitation, such computer-readable media can comprise a random-access memory (RAM), a read-only memory (ROM), an electrically erasable programmable ROM (EEPROM), compact disk ROM (CD-ROM) or other optical disk storage, magnetic disk storage, solid state memory, or any other data storage devices, combinations of the aforementioned types of computer-readable media, or any other medium that can be used to store computer executable code in the form of instructions or data structures that can be accessed by a computer. In the present invention, the term "instructions" can be used as a reference to "software" or a "computer program".

The above mentioned and described embodiments are only given as examples and should not be seen to be limiting to the present invention. Other solutions, uses, objectives, and functions within the scope of the invention as claimed in the below described patent claims should be apparent for the person skilled in the art.

References to "one embodiment," "an embodiment," "example embodiment," "various embodiments," etc., may indicate that the embodiment(s) of the invention so described may include a particular feature, structure, or characteristic, but not every embodiment necessarily includes the particular feature, structure, or characteristic.

Further, repeated use of the phrase "in one embodiment," or "in an illustrative embodiment," do not necessarily refer to the same embodiment, although they may. The various embodiments described herein may be combined and/or features of the embodiments may be combined to form new embodiments.

Unless specifically stated otherwise, as apparent from the following discussions, it is appreciated that throughout the specification discussions utilizing terms such as "processing," "computing," "calculating," "determining," or the like, refer to the action and/or processes of a computer or computing system, or similar electronic computing device, that manipulate and/or transform data represented as physical, such as electronic, quantities within the computing system's registers and/or memories into other data similarly represented as physical quantities within the computing system's memories, registers or other such information storage, transmission or display devices.

In a similar manner, the term "processor" may refer to any device or portion of a device that processes electronic data from registers and/or memory to transform that electronic data into other electronic data that may be stored in registers and/or memory. A "computing platform" may comprise one or more processors and/or databases.

Embodiments of the invention may include apparatuses for performing the operations herein. An apparatus may be specially constructed for the desired purposes, or it may comprise a general purpose device selectively activated or reconfigured by a program stored in the device.

Embodiments may be embodied in many different ways as a software component. For example, it may be a stand-alone software package, or it may be a software package incorporated as a "tool" in a larger software product, such as, for example, a scientific modeling product. It may be downloadable from a network, for example, a website, as a stand-alone product or as an add-in package for installation in an existing software application. It may also be available as a client-server software application, or as a web-enabled software application. One or more computers may be specialized by storing programming logic that enables one or more processors to perform the techniques indicated herein. As used herein, the term "application" may be one or more of the foregoing software embodiments installed on a user's device and intended to interact with a remote server.

While various embodiments of the invention have been described above, it should be understood that they have been presented by way of example only, and not limitation. Thus, the breadth and scope of the invention should not be limited by any of the above-described illustrative embodiments. The embodiments of the invention that have been described above may contain features that may be removed or combined between the described embodiments to derive additional embodiments.

Many of the features and applications of the present invention are implemented as software processes that are specified as a set of instructions recorded on a computer readable storage medium (also referred to as computer readable medium). When these instructions are executed by one or more processing unit(s) (e.g., one or more processors, cores of processors, or other processing units), they cause the processing unit(s) to perform the actions indicated in the instructions. Examples of computer readable media include, but are not limited to, CD-ROMs, flash drives, RAM chips, hard drives, EPROMs, etc. The computer readable media does not include carrier waves and electronic signals passing wirelessly or over wired connections.

In this specification, the term "software" is meant to include firmware residing in read-only memory or applications stored in magnetic storage, or storage in electronic devices (such as "flash drives") which can be read into memory for processing by a processor. Also, in some implementations, multiple software aspects of the subject disclosure can be implemented as sub-parts of a larger program while remaining distinct software aspects of the subject disclosure. In some implementations, multiple software aspects can also be implemented as separate programs. Finally, any combination of separate programs that together implement a software aspect described here is within the scope of the subject disclosure. In some implementations, the software programs, when installed to operate on one or more electronic systems, define one or more specific machine implementations that execute and perform the operations of the software programs.

A computer program (also known as a program, software, software application, script, or code) can be written in any form of programming language, including compiled or interpreted languages, declarative or procedural languages, and it can be deployed in any form, including as a standalone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

As used in this specification and any claims of this application, the terms "computer", "server", "processor", and "memory" all refer to electronic or other technological devices. These terms exclude people or groups of people. For the purposes of the specification, the terms display or displaying means displaying on an electronic device. As used in this specification and any claims of this application, the terms "computer readable medium" and "computer readable media" are entirely restricted to tangible, physical objects that store information in a form that is readable by a computer. These terms exclude any wireless signals, wired download signals, and any other ephemeral signals.

To provide for interaction with a user, implementations of the subject matter described in this specification can be implemented on a computer (whether a desktop, laptop, or mobile phone) having a display device, e.g., a CRT (cathode ray tube) or LCD (liquid crystal display) monitor, for displaying information to the user and a keyboard and a pointing device, e.g., a mouse or a trackball, by which the user can provide input to the computer or other input devices such as buttons or knobs. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, visual, or tactile input. In addition, a computer can interact with a user by sending documents to and receiving documents from a device that is used by the user; for example, by sending web pages to a web browser on a user's client device in response to requests received from the web browser.

Implementations of the subject matter described in this specification can be implemented in a computing system that includes a back end component, e.g., as a data server, or that includes a middleware component, e.g., an application server, or that includes a front end component, e.g., a client computer having a graphical user interface or a Web browser through which a user can interact with an implementation of the subject matter described in this specification, or any combination of one or more such back end, middleware, or front end components. The components of the system can be interconnected by any form or medium of digital data communication, e.g., a communication network. Examples of communication networks include a local area network ("LAN") and a wide area network ("WAN"), an inter-network (e.g., the Internet), and peer-to-peer networks (e.g., ad hoc peer-to-peer networks).

The computing system can include clients and servers. A client and server are generally remote from each other and typically interact through a communication network. The relationship of client and server arises by virtue of computer programs running on the respective computers and having a client-server relationship to each other. In some implementations, a server transmits data (e.g., an HTML page) to a client device (e.g., for purposes of displaying data to and receiving user input from a user interacting with the client device). Data generated at the client device (e.g., a result of the user interaction) can be received from the client device at the server.

Headings and subheadings, if any, are used for convenience only and do not limit the invention.

It is understood that the specific order or hierarchy of steps in the processes disclosed is an illustration of exemplary approaches. Based upon design preferences, it is understood that the specific order or hierarchy of steps in the processes may be rearranged. Some of the steps may be performed simultaneously. The accompanying method claims present elements of the various steps in a sample order, and are not meant to be limited to the specific order or hierarchy presented.

A phrase such as an "aspect" does not imply that such aspect is essential to the subject technology or that such aspect applies to all configurations of the subject technology. A disclosure relating to an aspect may apply to all configurations, or one or more configurations. A phrase such as an aspect may refer to one or more aspects and vice versa. A phrase such as an "embodiment" does not imply that such embodiment is essential to the subject technology or that such embodiment applies to all configurations of the subject technology. A disclosure relating to an embodiment may apply to all embodiments, or one or more embodiments. A phrase such an embodiment may refer to one or more embodiments and vice versa.

All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. Furthermore, to the extent that the term "include," "have," or the like is used in the description or the claims, such term is intended to be inclusive in a manner similar to the term "comprise" as "comprise" is interpreted when employed as a transitional word in a claim.

The invention claimed is:

1. A method for generating a master video, comprising:
receiving input from a video creator that initiates a video project;
sending to each of two or more respondents one or more prompts for the two or more respondents to provide one or more video files;
receiving the one or more video files from at least two of the two or more respondents wherein the one or more video files from one of the respondents is received separately from the one or more video files from another of the respondents;
combining the one or more video files received from the at least two of the respondents into a master video file, wherein the master video file corresponds to the master video and wherein the one or more video files received from the at least two of the respondents correspond to two or more master video segments in the master video, and wherein a relative position of each of the master video segments in the master video is based on a formulated sequence, and wherein the video creator and the two or more respondents are people, and wherein the master video is accessible to the video creator.

2. The method according to claim 1, wherein the formulated sequence is based on a master logic algorithm.

3. The method according to claim 1, wherein the relative position of each of the master video segments in the master video is based, at least in part, on the one or more prompts which are provided to the two or more respondents and/or responses to such one or more prompts by the two or more respondents.

4. The method according to claim 1, wherein the input received from the video creator comprises at least one input selected from the group consisting of: a project title, an opening message, a topic, a name, one or more prompts, a closing message, a video thumbnail, a deadline for submission of the video files, digital image files, a maximum number of the video files, and a list of contact information for the respondents, wherein the opening message and/or the closing message and/or the prompts comprise text and/or video and/or audio.

5. The method according to claim 2, further comprising creating a project database with fields correlated to the master logic algorithm, wherein the master logic algorithm is based on a standard logic algorithm and on input provided by the video creator.

6. The method according to claim 1, wherein each item of the input provided by the video creator and/or each of the one or more video files provided by the two or more respondents is sent to be stored in data storage, is stored, and is given a unique identifier that reflects its storage location, and wherein at least one field of a project database is updated to record a storage location of each item of input provided by the video creator and/or each of the one or more video files provided by the two or more respondents.

7. The method according to claim 1, further comprising: creating an initial master video file based on the input, wherein the initial master video file is configured to generate an initial master video, and wherein an intermediary version of the master video file is generated upon the receipt of each of the one or more video files, wherein each intermediary version of the master video file is configured to generate an intermediary version of the master video, the method further comprising requesting a modification of one intermediary version of the master video, resulting in a generation of a further version of the master video file which is configured to generate a further version of the master video.

8. The method according to claim 4, wherein combining the one or more video files into the master video file further comprises including in the master video file data corresponding to the least one input, and wherein the at least one input is selected from the group consisting of: the project title, the opening message, the topic, the name, the one or more prompts, the closing message, the video thumbnail, and the digital image files.

9. The method according to claim 1, wherein A) a version of the master video file is automatically created upon receipt of at least one of the one or more video files or B) wherein combining the one or more video files into the master video file occurs as each of the one or more video files is received, resulting in a different version of the master video file being created as each additional of the one or more video files is received and combined into the master video file.

10. The method according to claim 1, further comprising:
generating new versions of the master video file by incorporating data corresponding to additional video files received from the two or more respondents and/or data corresponding to edits made to the master video by the video creator;
storing the new versions of the master video file in a data storage location thereby rewriting previous versions of the master video file or storing the new versions of the master video file in different data storage locations, wherein storing the new versions of the master video file in different data storage locations further comprises creating master video identification data to identify the location of the new versions of the master video file and in either case updating a project database with the master video identification data to keep track of the location of the new versions of the master video file.

11. The method according to claim 1, wherein the one or more prompts comprise at least one selected from the group consisting of: questions and topics; and wherein the prompts are generated by the video creator and/or are chosen from a list of standard prompts.

12. The method according to claim 2, wherein the formulated sequence is based on at least one selected from the group consisting of: the respondents who respond, prompts which are responded to by the respondents, a number of respondents, a number of prompts, the prompts which are assigned to each respondent, a total number of responses to be collected, and a response time limit for providing the one or more video files.

13. The method according to claim 1, wherein a version of the master video file is created based on a database which includes placeholders correlated with the input, wherein the input comprises at least one selected from the group consisting of: one or more prompts, video segments, titles, transitions, animations, introductions, ending portions, and credits, wherein such placeholders are correlated with a tag and/or metadata and/or other identifiers corresponding to such inputs, and wherein the placeholders are arranged pursuant to a master logic algorithm.

14. The method according to claim 1, wherein at least one of the one or more prompts sent to the two or more respondents is associated with a tag, metadata, an/or other identifier specific for such two or more respondents and/or wherein each video file is associated with a tag, metadata, and/or other identifier designating which of the two or more respondents submitted such video file, which prompt it is in response to, and/or designating a location in the master video where a corresponding master video segment is determined to be positioned.

15. The method according to claim 1, further comprising editing the master video file, wherein editing the master video file comprises requesting at least one change to the master video selected from the group consisting of: adding transitions, ensuring consistent video quality, providing consistent audio levels, smoothing transitions between at least two of the video segments in the master video, adjusting the length of any of the video segments, adjusting the location of the prompts in the master video, adjusting the location of the master video segments in the master video, removing master video segments, adding filters, adding text, editing text, adjusting volume levels, adjusting brightness, and adjusting contrast.

16. The method according to claim 1, further comprising sharing the master video file, wherein the sharing of the master video file occurs when all prompts used to create the master video file have been answered, the video creator has received all video files from all the respondents, a predetermined time has elapsed, a designated number of the video files have been received, the video creator has initiated sharing, or another triggering event has occurred.

17. The method according to claim 1, further comprising generating a different version of the master video file in real time upon the receipt of each of the one or more video files.

18. A system for generating a master video, comprising:
one or more processors;
one or more data storage devices;
one or more input devices;
one or more output devices;
a network interface; and
at least one communications bus, wherein the at least one communications bus operably interconnects the one or more processors, the one or more data storage devices, the one or more input devices, the one or more output devices, and the network interface, and wherein the one or more data storage devices comprise instructions stored therein, which when executed by the one or more of the processors, cause the processors to perform operations including:
receiving input from a video creator that initiates a video project;
soliciting video file responses from two or more respondents;
receiving one or more video files from at least two of the two or more respondents wherein the one or more video files from one of the respondents is received separately from the one or more video files from another of the respondents;
combining the one or more video files received from the at least two of the respondents into a master video file, wherein the master video file corresponds to the master video and the one or more video files received from the at least two of the respondents correspond to two or more master video segments in the master video, and wherein the relative position of each of the master video segments in the master video relative to one another is based on a formulated sequence, and wherein the video creator and the two or more respondents are people, and wherein the master video is accessible to the video creator.

19. A non-transitory computer readable medium storing instructions thereon that, when executed by at least one processor, cause a computer system to:
receive input from a video creator that initiates a video project;
solicit video file responses from two or more respondents;
receive one or more video files from at least two of the two or more respondents wherein the one or more video files from one of the respondents is received separately from the one or more video files from another of the respondents; and
combine the one or more video files received from the at least two of the respondents into a master video file, wherein the master video file corresponds to a master video and wherein the one or more video files from the at least two of the respondents correspond to two or more master video segments in the master video, and wherein the relative position of each of the master video segments in the master video relative to one another is based on a formulated sequence, and wherein the video creator and the two or more respondents are people, and wherein the master video is accessible to the video creator.

20. The non-transitory computer readable medium according to claim 19, wherein the non-transitory computer readable medium comprises at least one selected from the group consisting of: random access memory, read-only memory, electrically erasable programmable read only memory, compact disk, magnetic disk, and solid state memory.

21. The system according to claim 18, wherein the soliciting of video file responses from the two or more respondents comprises sending the respondents one or more prompts which comprise at least one selected from the group consisting of: questions and topics.

22. The non-transitory computer readable medium according to claim 19, wherein the soliciting of the video file responses from the two or more respondents comprises sending the two or more respondents one or more prompts which comprise at least one selected from the group consisting of: questions and topics.

23. The method according to claim 1, wherein the sending to each of the two or more respondents one or more prompts comprises providing the two or more respondents access to requests for the one or more video files via a web link or an email.

24. The system according to claim 18, wherein the soliciting of video file responses from the two or more respondents comprises providing the two or more respondents access to requests for the one or more video files via a web link or an email.

25. The non-transitory computer readable medium according to claim 19, wherein the soliciting of video file responses from the two or more respondents comprises providing the two or more respondents access to requests for the one or more video files via a web link or an email.

26. The method according to claim 1, wherein the sending to each of the two or more respondents the one or more prompts comprises sending to at least one of the respondents a URL link which, when clicked, provides instructions for recording a video to generate one of the one or more video files.

27. The system according to claim 18, wherein the soliciting of video file responses from the two or more respondents comprises providing access for at least one of the respondents to a URL link which, when clicked, provides instructions for recording a video to generate one of the one or more video files.

28. The non-transitory computer readable medium according to claim 19, wherein the soliciting of video file responses from the two or more respondents comprises providing access for at least one of the respondents to a URL link which, when clicked, provides instructions for recording a video to generate one of the one or more video files.

29. The method according to claim 1, wherein the receiving of the one or more video files from the two or more respondents comprises receiving at least one of the video files from at least one selected from the group consisting of: a mobile phone, a tablet, a desktop computer, and a laptop computer.

30. The system according to claim 18, wherein the receiving of the one or more video files from the two or more respondents comprises receiving at least one of the video files from at least one selected from the group consisting of: a mobile phone, a tablet, a desktop computer, and a laptop computer.

31. The non-transitory computer readable medium according to claim 19, wherein the receiving of the one or more video files from the two or more respondents comprises receiving at least one of the video files from at least one selected from the group consisting of: a mobile phone, a tablet, a desktop computer, and a laptop computer.

* * * * *